US006040049A

United States Patent [19]

Tominaga et al.

[11] Patent Number: 6,040,049

[45] Date of Patent: Mar. 21, 2000

[54] COMPOSITE FILM AND METHOD OF MANUFACTURING SURFACE COATING MATERIAL

[75] Inventors: Youji Tominaga; Kazuo Toda; Nobuo Yamamura, all of Tsushima, Japan

[73] Assignee: GEN Maintenance Technology Inc., Tsushima, Japan

[21] Appl. No.: 08/953,993

[22] Filed: Oct. 20, 1997

[30] Foreign Application Priority Data

| | | | |
|---|---|---|---|
| Oct. 21, 1996 | [JP] | Japan | 8-298165 |
| Jan. 16, 1997 | [JP] | Japan | 9-019710 |
| Sep. 2, 1997 | [JP] | Japan | 9-254347 |

[51] Int. Cl.[7] ........ B32B 7/12

[52] U.S. Cl. ........ 428/355 EN; 428/918; 428/355 R; 428/355 CN; 428/352; 156/272.2

[58] Field of Search ........ 428/352, 355 EN, 428/355 R, 918; 156/272.2

[56] References Cited

FOREIGN PATENT DOCUMENTS 8-148354 5/1996 Japan .
8-255476 9/1996 Japan .

*Primary Examiner*—Terrel Morris
*Assistant Examiner*—Arti Singh
*Attorney, Agent, or Firm*—Oblon, Spivak, McClelland, Maier & Neustadt, P.C.

[57] ABSTRACT

A composite film for forming a resinous coating film on a surface of a to-be-coated material. The composite film has at least one water-soluble resinous coating film, at least one of which is formed on a surface of the composite film which is brought into contact with the surface of the to-be-coated material closely, and a base sheet to which the water-soluble resinous coating film adheres and transmits light therethrough. The water-soluble resinous coating film formed on the surface of the composite film which is brought into contact with the surface of the to-be-coated material closely is hardened in close contact with the to-be-coated material, with water interposed between the water-soluble resinous coating film and the to-be-coated material and adheres to the to-be-coated material to form a water-insoluble coating film. It is preferable that the application amount of the water is in a range of 1.5 $g/m^2$–10 $g/m^2$. It is preferable that at least one layer of water-insoluble resinous coating film is interposed between the base sheet and the water-soluble resinous coating film. It is preferable that polyethylene-imine and polyvinyl alcohol is contained in the water-soluble resinous coating film or the water.

24 Claims, 6 Drawing Sheets

COMPOSITE FILM AND METHOD OF MANUFACTURING SURFACE COATING MATERIAL

BACKGROUND OF THE INVENTION

1. Field of the Invention

The present invention relates to a composite film for coating the surface of wood, plastic, ceramic, stone, concrete, metal, and the like. The present invention also relates to a method of manufacturing a surface coating material formed of the composite film. In particular, the present invention relates to the composite film which is used as a coating film for daily maintenance, ornament, and protection of materials such as wood, plastic, ceramic, stone, concrete, metal, and the like.

2. Description of the Related Arts

Liquid paint has been hitherto applied to the surface of a to-be-coated material to decorate or protect wood, plastic, ceramic, stone, concrete, metal, and the like.

However, the liquid paint has a fatal defect.

That is, the liquid paint splashes or wets materials which should not be wet when it is applied to the surface of a to-be-coated material, thus being attached to portions which should not be painted. Further, the liquid paint may be attached to an operator's body. In addition, it is difficult to obtain a coating film which coats the surface of the material in a uniform thickness. In the case of colored paint, when the surface of the to-be-coated material is painted in non-uniform thickness, various tones are formed on the surface thereof.

Furthermore, because organic substance contained in paint is liable to volatilize, a workroom is filled with gas volatilized from the organic substance, which deteriorates the atmosphere of the workroom. Thus, a large painting equipment such as a painting booth is required.

In order to solve the above-described defects of the liquid paint, the paint or the marking film is described in "Painting Technology" (published in 1988, Vol. 23, No. 7, page 271).

In addition, according to Japanese Laid-Open Patent Publication No. 2-166000, an application film is provided to prevent generation of bubbles which are liable to be generated when a composite film is attached to a to-be-coated material, and a method of facilitating the positioning of the composite film in bonding it to the to-be-coated material is also provided.

Further, a composite film is disclosed in Japanese Laid-Open Patent Publication No. 5-38797. According to the composite film, after an extensible semi-hardened resin film is stuck to a to-be-coated material, the resin film is hardened by irradiation. Thus, the,resin film can be stuck to articles having irregular surfaces or curved surfaces in addition to an article having a flat surface.

However, although the conventional composite film is capable of forming a mirror-like surface on the to-be-coated material, it is incapable of duplicating very fine irregularity of the to-be-coated material.

Therefore, the conventional liquid paint is indispensable for representing fine irregularity of the to-be-coated material beautifully. That is, the conventional composite film is not used to express the fine irregularity such as capillary tubes of wood but used to form a smooth surface of the to-be-coated material. Therefore, it is difficult for the conventional method to form a composite film duplicating fine irregularity. That is, the conventional method is accomplishing open pore surface finish well known in the field of woodworking.

The open pore means a method of coating the surface of natural solid material or plywood. In this method, capillary tubes are not charged with filler but a thin liquid paint is penetrated into the natural solid material or the plywood and thinly attached to the surface thereof to keep the natural appearance thereof.

SUMMARY OF THE INVENTION

In view of the above-described problems of the conventional art, the present invention has been made. Thus, it is an object of the present invention to provide a composite film capable of coating a surface of a to-be-coated material with a fine appearance and a high degree of strength by means of a mirror-like surface finish and a high-quality surface finish such as an open pore surface finish, allowing a resinous coating film having a high degree of waterproofness and adhesiveness to be formed, and easy to handle; and provide a method of manufacturing a surface coating material formed of the composite film.

There is provided a composite film for forming a resinous coating film on a surface of a to-be-coated material, comprising at least one water-soluble resinous coating film, at least one of which is formed on a surface of the composite film which is brought into contact with the surface of the to-be-coated material closely, and a base sheet to which the water-soluble resinous coating film adheres and transmits light therethrough, wherein the water-soluble resinous coating film formed on the surface of the composite film which is brought into contact with the surface of the to-be-coated material closely is hardened in close contact with the to-be-coated material, with water interposed between the water-soluble resinous coating film and the to-be-coated material and adheres to the to-be-coated material to form a water-insoluble coating film; and at least one of the water-soluble resin coating films is hardened by irradiation.

The function and effect of the present invention are described below.

Water is applied to the surface of the water-soluble resinous coating film and/or the surface of the to-be-coated material to bring the composite film into contact with the to-be-coated material closely. As a result, a part of the water-soluble resinous coating film or the entirety thereof is dissolved or gelled.

The water-soluble resinous coating film in the dissolved state or the gelled state penetrates into the interior of the to-be-coated material, depending on the surface structure thereof. The penetration characteristic of the water-soluble resinous coating film is an important factor greatly affecting the physical property of the water-soluble resinous coating film in the dissolved state or the gelled state, the physical property of the resinous coating film formed immediately after the water-soluble resinous coating film is hardened, and the degree of the adhesiveness of the resinous coating film to the to-be-coated material and the distribution thereof. The penetration characteristic of the water-soluble resinous coating film is also an important factor greatly affecting the distribution of the degree of hardening of the resinous coating film, based on the difference in the distance between a light source and convex and concave portions of the surface of the to-be-coated material, namely, the position of the release interface of the resinous coating film and the shape thereof in removing the base sheet from the resinous coating film.

Further, the dissolving speed of the water-soluble resinous coating film, the physical property thereof in its dissolved state or gelled state, and the physical property of the resinous coating film formed immediately after the water-soluble resinous coating film is hardened, for example, the tack characteristic and viscoelastic characteristic thereof are adjusted in consideration of the affinity of the water-soluble resinous coating film in its dissolved state or gelled state for the surface of the to-be-coated material. In this manner, the water-soluble resinous coating film is allowed to penetrate into fine concaves such as capillary tubes present on the surface of the to-be-coated material and further, the water-soluble resinous coating film can be hardened entirely or partly.

In order to obtain the resinous coating film having irregularity, a part of the water-soluble resin which has penetrated into concaves present on the surface of the to-be-coated material is kept dissolved or gelled. Most of the water-soluble resin which has penetrated into the concaves is removed when the base sheet is removed from the resinous coating film. Thus, fine irregularity having a shape and size similar to the shape and size of the irregularity present on the surface of the to-be-coated material can be formed on the surface of the resinous coating film. That is, the open pore surface finish can be accomplished.

In order to obtain the resinous coating film having a mirror-like surface finish, the water-soluble resinous coating film positioned in close contact with the surface of to-be-coated material is hardened completely or the water-soluble resinous coating film is hardened such that the release surface thereof becomes flat. In this manner, the resinous coating film is allowed to have a mirror-like surface finish by removing the base sheet therefrom.

It is preferable that after the composite film is placed on the surface of the to-be-coated material, a pressing tool such as a roller made of rubber, plastic, metal or wood; a circular rod; and a spatula is pressed against the composite film to reliably bring the water-soluble resinous coating film into contact with the to-be-coated material closely.

A thin disc may be rotated on the composite film along straight grooves present on the surface of a wooden flooring to press the composite film against the to-be-coated material. In this manner, the straight grooves present on the surface of the wooden flooring can be accurately represented on the surface of the resinous coating film.

The composite film may be repeatedly irradiated to the surface, of the base sheet. Further, while the composite film is repeatedly irradiated, the pressing tool or the rotary thin disc may be pressed against the composite film.

It is preferable that after the base sheet is removed from the resinous coating film, the surface of the resinous coating film is irradiated again to allow the resinous coating film to adhere to the to-be-coated material at a higher degree and increase the degree of water-insoluble property of the resinous coating film.

The wavelength and intensity of light which is used to irradiate the composite film again are not necessarily identical to the wavelength and intensity used before the base sheet is removed from the resinous coating film. The composite film may be irradiated more than once.

In the composite film of the present invention, the resinous coating film can be formed without generating air bubbles between the resinous coating film and the to-be-coated material. Further, no wrinkles are formed on the resinous coating film.

When a water-insoluble resinous coating film is placed in contact with surface of the to-be-coated material, water cannot be applied to the to-be-coated material but instead, liquid organic substance is applied thereto in dissolving or gelling the water-insoluble resinous coating film.

In this case, it is difficult to adjust the viscosity or vaporization speed of the organic material and the speed of penetration thereof into the to-be-coated material. Thus, it is difficult to contact the water-insoluble resinous coating film closely. Further, air bubbles are liable to be generated between the resinous coating film and the to-be-coated material, and the resinous coating film is liable to wrinkle. When the to-be-coated material is made of wood having many capillary tubes, the resinous coating film tends to fail to hold the organic material in such a large amount as to fill concaves of the capillary tubes. Therefore, fine gaps are generated between the resinous coating film and the to-be-coated material. As a result, air and gas are enclosed in the gaps to form bubbles.

When the resinous coating film of the composite film is adhered to the to-be-coated material, the organic material applied to the to-be-coated material flows out from the edge of the composite film and the to-be-coated material, thus soiling the to-be-coated material and work tables or attaching to operators' hands or bodies. The organic material is harmful to the human body and has an irritant action on skin and may cause the operators to be effloresce.

In the composite film of the present invention, not the organic material, but water is interposed between the water-soluble resinous coating film and the to-be-coated material. Thus, even though the water flows out from the gap positioned at the edge of the composite film and the to-be-coated material, the water does not affect human body adversely. Further, unlike the conventional resinous coating film to which the organic material is applied, the water-soluble resinous coating film of the present invention does not generate a gas harmful to the human body, thus not causing the operators to be efflorescent or cancer to grow on them or not polluting environmental air.

According to the conventional method, before the composite film is brought into contact with the to-be-coated material closely, the surface of the to-be-coated material is cleaned by release agent, organic substance or cleaning agent to remove dirt which has attached to the surface thereof, and thereafter, the surface thereof is washed by water, and then, water left thereon is wiped. According to the composite film of the present invention, because water is interposed between the water-soluble resinous coating film and the to-be-coated material, the composite film can be brought into contact with the to-be-coated material closely immediately after the surface of the to-be-coated material is cleaned without using cleaning agent. Thus, it is unnecessary to wipe the water on the surface of the to-be-coated material, which shortening resinous coating film-forming time period.

In the process of hardening the water-soluble resinous coating film and fixing it to the to-be-coated material, the water-soluble resinous coating film is dissolved or gelled stably, thus adhering thereto at a high strength. Accordingly, unlike the conventional composite film, there is no need for using a large equipment such as a vacuum press or a pressure press in fixing the water-soluble resinous coating film to the to-be-coated material.

Furthermore, in the composite film of the present invention, at least one water-soluble resinous coating film is hardened by irradiating it. Thus, the to-be-coated material is hardly subjected to thermal and mechanical influence. That is, the resinous coating film can be hardened without deforming the to-be-coated material thermally and mechanically.

This and other objects, features, and advantages of the present invention will be become apparent upon reading of the following detailed description and drawings.

DETAILED DESCRIPTION OF THE INVENTION

Figure 1:
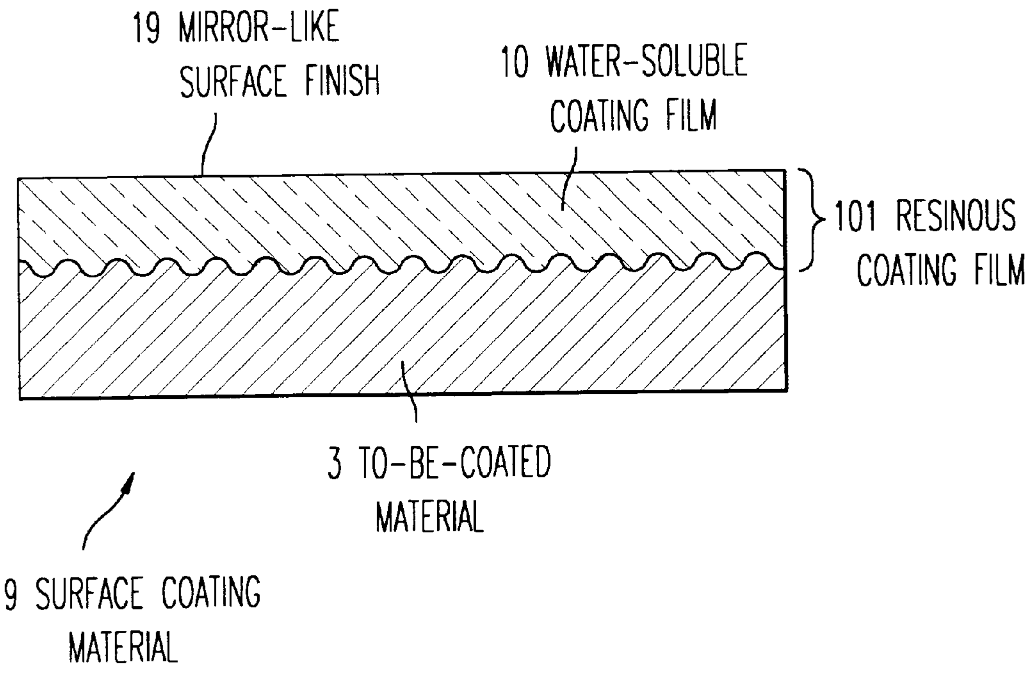
FIG. 1 is an explanatory sectional view showing a surface coating material according to embodiment 1.

The composite film of the present invention has one or more water-soluble resinous coating films.

In the case of the composite film having one water-soluble resinous coating film, the water-soluble resinous coating film is formed on a surface of the composite film which is brought into close contact with a surface of to-be-coated material and is hardened by irradiation.

In the case of the composite film having two or more water-soluble resinous coating films, at least one of them is required to be hardened when it is irradiated. In this case, the water-soluble resinous coating film formed on the surface of the composite film which is brought into close contact with the surface of to-be-coated material may be hardened by means other than irradiation means. That is, the water-soluble resinous coating film formed on the surface of the composite film which is brought into close contact with the surface of to-be-coated material may be hardened by the influence of a resinous coating film in close contact therewith.

As the material of the base sheet, any resins which allow resinous coating film-hardening light rays to pass therethrough can be preferably used. For example, surface treating paper and the following resins containing acetic acid cellulose can be used as the material of the base sheet. The resin containing acetic acid cellulose includes polystyrene, acrylic polymer, polycarbonate, polyvinyl chloride, polystyrene, polypropylene, alkyl benzene sulfonic acid, polyethylene terephthalate, PEN (polyethylene naphthalate), polyvinyl alcohol, cellulose acetate, and cellulose butylate.

The kind and thickness of the base sheet can be selected, depending on the property, size, and shape of the resinous coating film, and the kind of light which irradiates the composite film. After the resinous coating film adheres to the to-be-coated material, the base sheet can be removed from the resinous coating film by any one of the known surface-treating methods, with the resinous coating film which has become water-insoluble adhering to the to-be-coated material.

The to-be-coated material has a smooth surface or an irregular surface. The to-be-coated material includes wood, plastic, ceramic, stone, concrete, metal, and the like. Further, a to-be-coated material on which a coating film has been formed can be coated with the composite film.

It is preferable that the water-soluble resinous coating film formed on the surface of the composite film which is brought into close contact with the surface of to-be-coated material contains a reactive compound having vinyl groups and functional group, reaction initiator, and hardener. The water-soluble resinous coating film will be hardened by being irradiated, thus displaying the effect of the present invention.

The vinyl groups means a structure similar to the vinyl group. Thus the vinyl groups include vinyl group, acryloyl group, aryl group, and double bonds.

The functional group means groups which react with the hardener, thus changing components of the composite film from a fluid state into an appropriately viscous semi-gelled state. The functional group includes hydroxyl group, amino group, epoxy group, carboxyl group, cyano group, and the like.

The reactive compound having the vinyl groups and the functional group includes epoxy acrylate oligomer, alkyd acrylate oligomer, urethane acrylate oligomer, polyester acrylate oligomer, melamine acrylate oligomer, polybutadiene acrylate oligomer, spirane acrylate oligommer, unsaturated polyester resin, unsaturated (metha) acrylic resin, alkyd resin, polyether acrylic resin, urethane acrylic resin, epoxy resin. These substances can be used singly or in combination.

According to the classification described on page 152 of "UV.EB Hardening Technique" (published in 1982 by Publishing Department of General Technology Center), the reactive compound is classified into cleavage type, hydrogen-removing type, and ion reaction type. Any of these types of reactive compounds can be used.

The reaction initiator includes benzyl dimethyl ketal; 1-hydroxycyclohexyl phenyl ketone, 2-methyl-1-[4-(methyl thio) phenyl]-2-morpholino propanone-1,2-hydroxy-2-methyl-1-phenyl propane-1-on; 2-benzyl-2-dimethylamino-1-(4-morpholinophenyl)-butanone-1,1-[4-(2-hydroxyethoxy)-phenyl]-2-hydroxy-2-methyl-1-propane-1-on; bis(cyclopentadienyl)-bis(2,6-difluoro-3(pyl-1-yl phenyl) titanium; bisacyl phosphone oxide; 2,4,6-trimethyl benzoyldiphenyl phosphine oxide, benzoinalkyl ether.

The reaction initiator further includes benzoin methyl ether; benzoin ethyl ether; benzoin isopropyl ether; benzoin isobutyl ether; 1-(4-isopropyl phenyl)-2-hydroxy-2-methyl propane-1-on; P-tert-butyl trichloro acetophenone; P-tert-butyl dichloro acetophenone; benzyl; benzoin; acetophenone; benzophenone.

The reaction initiator further includes 1-phenyl-1,2-propanedion-2-(O-ethoxycarbonyl)oxime; 2-chlorothioxanthon; 2-methylthioxanthon; dibenzo suberon; 2,4-diethylthioxanthon; 2,4-diisopropylthioxanthon; 2,4-dimethylthioxanthon; 4,4'-dichlobenzophenone; 4,4'-bisdimethylaminobenzophenone; 4,4'-bisdiethylaminobenzophenone; 3,3',4,4'-tetra(t-butyl peroxy carbonyl), benzophenone; benzalacetone; biacetyl; α,α-dichloro-4-phenoxyacetophenone; and 2-ethylanthraquinone.

The reaction initiator further includes n-butyl benzoin ether; iso-butyl benzoin ether; tetramethylthiuram sulfide; azobisisobutylnitrile; benzoyl peroxide; 3,3-dimethyl-4-metoxybezophenone; methylbenzoyl formate; 2,2-diethoxyacetophenone; acyl oxime ester; chlorinated acetophenone; hydroxyacetophenone, acyl phosphine oxide; isobutylthioxanton; 4-N,N'-dimethylacetophenone; acetophenone diethyl ketal; and 4'-isopropyl-2-hydroxy-2-methylpropiophenone.

The reaction initiator further includes methyl phenyl glyoxylate; methyl O-benzoylbenzoate; methyl P-dimethyl aminobenzoate; 2,2'-bis(O-chlorophenyl)-4,5,4',5'-tetraphenyl-1,2'-biimidazol; 10-butyl-2-chloroacrydon; camphorquinone; 3-ketocoumalin; anthroquinone; α-naphthyl; acenaphthene; P,P'-dimethoxybenzyl; P,P'-dichlorobenzyl; 2,6-dimethyl benzoyl diphenyl phosphine oxide; benzoyldiethoxy phosphine oxide; α-chloroanthroquinone; 2-tert-butylanthroquinone; and bis (2,6-dimethoxy benzoyl)-2,4,4-trimethyl-pentylphosphine oxide.

These substances can be used independently or in combination of a plurality thereof.

The hardener is required to be used with the reaction compound and the reaction initiator. The following substances are exemplified as the hardener:

1) toluene di-isocyanate (hereinafter referred as TDI), a mixture of TDI and trimethylol propane (hereinafter referred as TMP) added to TDI, and trimer consisting of isocyanurate (hereinafter referred as IC);

2) hexamethylene diisocyanate (hereinafter referred as HDI), mixture of HDI and TMP added to the HDI, IC, and trimer consisting of biuret;

3) diphenylmethane diisocyanate (hereinafter referred as MDI), mixture of MDI and TMP added to the MDI, and trimer consisting of IC;

4) xylene di-isocyanate (hereinafter referred as XDI), mixture of XDI and TMP added to the XDI, and trimer consisting of IC;

5) naphthalene di-isocyanate (hereinafter referred as NDI), mixture of NDI and TMP added to the NDI, and trimer consisting of IC; and 6) isophorone di-isocyanate (hereinafter referred as PDI), mixture of PDI and TMP added to the PDI, and trimer consisting of IC.

It is preferable that the water-soluble resinous coating film formed on the surface of the composite film which is brought into close contact with the surface of to-be-coated material contains a reaction compound having the vinyl groups and the reaction initiator. The water-soluble resinous coating film is hardened by irradiation, thus displaying the effect of the present invention.

In addition to the reaction compound having the vinyl groups and the functional group, the following substances can be preferably used as the reaction compound having the vinyl groups. As monofunctional monomers, (metha) acrylic acid, methyl (metha) acrylate, ethyl (metha) acrylate, butyl (metha) acrylate, hexyl acrylate, 2-ethylhexyl (metha) acrylate, iso-octyl (metha) acrylate, 2-hydroxyl methyl (metha) acrylate, 2-hydroxypropyl (metha) acrylate, N,N'-dimethylaminoethyl (metha) acrylate, N,N'-diethylaminoethyl (metha) acrylate, glycidyl (metha) acrylate, Carbitol acrylate, iso-bornyl acrylate, styrene, acrylonitrile, vinyl acetate, vinyl toluene.

As bifunctional monomers, the following substances can be preferably used: 1,6-hexanediol (metha) acrylate, neopentyl glycol di (metha) acrylate, ethylene glycol di (metha) acrylate, polyethylene glycol di (metha) acrylate, polypropylene glycol di (metha) acrylate, butylene glycol di (metha) acrylate, pentaerythtol diacrylate, and 1,4-butanediol diacrylate.

As multifunctional monomers, the following substances can be preferably used: trimethylol propane tri (metha) acrylate, pentaerythritol acrylate, dipentaerythritol hexaacrylate, tetramethylol methane tetraacrylate, acrylic acid ester of N,N,N',N'-tetrakis(β-hydroxyethyl)ethyl diamine.

As aryl-contained monomer, diaryl phthalate, diaryl isophthalate, and diaryl adipate can be used.

These substances can be used singly or in combination.

As the reaction initiator, those similar to the above-described substances can be used.

It is preferable that the water-soluble resinous coating film formed on the surface of the composite film which is brought into close contact with the to-be-coated material consists of water-soluble adhesive agent. The water-soluble resinous coating film is dissolved or gelled, thus being hardened by the influence of a resinous coating film in close contact therewith and displaying the advantage of the present invention effectively.

Water-soluble resins such as pigment adhesive agent and sticky agent having adhesiveness can be used as the water-soluble resinous coating film. Thus, the following substances can be used as the water-soluble resin: alkyd resin, acrylic resin, epoxy resin, urethane resin, polyvinyl alcohol, polyvinyl alcohol acetal, polyvinyl alcohol urethan, polyacrylic acid (salt), polyacrylic amide, polyvinyl methyl ether, polyvinyl pyrrolidone, polyethylene oxide, polypropylene oxide, carboxymethylcellulose, methylcellulose, ethylcellulose, hydroxymethylcellulose, alginic acid, acetylated starch, hydroxy ethylated starch, dialdehide starch, dextrin, glue, gelatine, casein.

It is preferable that the water-soluble resinous coating film consists of a colored layer and/or a printed layer to impart various colors and/or designs to the resinous coating film. The colored layer and/or the printed layer can improve the decorativeness of the resinous coating film.

Colorant such as pigment or dye is uniformly dispersed in the water-soluble resinous coating film to form the colored layer. Substances which are contained in paint can be used as the colorant. The pigment includes titanium oxide, iron oxide, carbon black, cyanine pigment, quinacridone pigment. The dye includes azo dye, anthraquinone dye, indigoid dye, stilbenzene dye. Metal powders such as aluminum flake, nickel powder, gold powder, and silver powder can be used as the colorant.

A color and/or a design are applied to a material by the conventional printing method to form the printed layer.

It is preferable that at least one water-insoluble resinous coating film is interposed between the base sheet and the water-soluble resinous coating film positioned in close contact with the surface of to-be-coated material.

The water-insoluble resinous coating film means a resinous coating film which has been hardened and become insoluble in water or a resinous coating film insoluble therein before it is hardened. The shape and thickness of the surface of the resinous coating film to be formed on the surface of the to-be-coated material can be freely changed by using the water-insoluble resinous coating film.

The formation of the water-insoluble resinous coating film between the water-soluble resinous coating film and the base sheet provides the following advantage: That is, the resinous coating film formed by hardening the water-soluble resinous coating film can be provided with such a high degree of waterproofness and adhesiveness to the to-be-coated material that the resinous coating film can be used reliably. Further, when the resinous coating film is in contact with water or the like for a long time, the resinous coating film does not wet or swell.

The following water-insoluble resins can compose the water-insoluble resin: resins containing a reactive compound having vinyl groups and functional group, reaction initiator, and hardener or a reactive compound having the vinyl groups and the reaction initiator. In this case, the water-insoluble resinous coating film is capable of adhering to the water-soluble resinous coating film easily.

As the water-insoluble resinous coating film, it is also possible to use the previously described substances which harden the same composition of above-described water-soluble resinous coating film.

It is preferable that the resins composing the water-soluble resinous coating film and the water-insoluble resinous coating film are hardened by irradiation to form the resinous coating film easily.

A plurality of water-insoluble resinous coating films may be laminarly formed between the base sheet and the water-soluble resinous coating film. The number of the water-insoluble resinous coating films is determined, depending on the purpose of use.

It is preferable that the water-insoluble resinous coating film consists of a colored layer and/or a printed layer to obtain the effect similar to that provided by the water-soluble resinous coating film consisting of the colored layer and/or the printed layer. As the materials of the colored layer and/or the printed layer of the water-insoluble resinous coating film, those composing the water-soluble resinous coating film can be used.

It is preferable that the surface of the water-soluble resinous coating film of the composite film is coated with a release sheet in advance to prevent water being absorbed by the water-soluble resinous coating film during transport, namely, to prevent the composite film from being wet. The provision of the release sheet allows the composite film to be handled easily.

It is preferable that the release sheet has a property of protecting the water-soluble resinous coating film of the composite film from water to prevent the water-soluble resinous coating film from becoming adhesive during the composite film-forming process.

It is possible to use both a release sheet which transmits light therethrough and a release sheet which does not transmit light therethrough.

The release sheet is removed from the composite film before it is brought into close contact with the surface of the to-be-coated material.

As the material of the release sheet, surface treating paper and resins containing acetic acid cellulose can be used. For example, it is possible to use polystyrene, acrylic polymer, polycarbonate, polyvinyl chloride, polystyrene, polypropylene, alkyl benzene sulfonic acid, polyethylene terephthalate, PEN (polyethylene naphthalete), polyvinyl alcohol, cellulose acetate, and cellulose butylate. Various types of surface treatments can be made on the release sheet.

Instead of the release sheet, it is also possible to use other means capable of preventing water being absorbed in the water-soluble resinous coating film to prevent the composite film being wet during transport.

It is preferable that the water-soluble resinous coating film contains polyvinyl alcohol (hereinafter referred to as PVA) in addition to the reaction compound, the reaction initiator, and hardener. When the water-soluble resinous coating film is hardened in the presence of polyethylene-imine and water, a resinous coating film having a high adhesive strength can be formed.

It is favorable the weight percentage of the PVA is 37–61 with respect to the whole weight of resin contained in the water-soluble resinous coating film to allow the composite film to adhere to the to-be-coated material at a high degree and prevent the resinous coating film from being cracked easily.

If the weight percentage of the PVA is less than 37 wt %, the degree of adhesiveness of the resinous coating film to the to-be-coated material may deteriorate. If the weight percentage of the PVA is more than 61, the strength of the resinous coating film may deteriorate and thus be frail.

It is more favorable that the weight percentage of the PVA to be contained in the water-soluble resinous coating film is 40–54 wt % with respect to the whole weight of the resin contained in the water-soluble resinous coating film to allow the resinous coating film to adhere to the to-be-coated material at a higher degree and have a higher degree of strength.

It is favorable that the PVA is contained at 61 wt % or less with respect to the whole weight of the resin contained in the water-soluble resinous coating film. If the weight percentage of the PVA is more than 61 wt %, there is a possibility that the resinous coating film is frail.

It is more favorable that the PVA is contained at 40–54 wt % with respect to the whole weight of the resin contained in the water-soluble resinous coating film. At the weight percentage of 40–54, the water-soluble resinous coating film is allowed to form the resinous coating film which adheres to the to-be-coated material at a high degree and can be prevented from being cracked easily.

It is preferable that the saponification value of the PVA is 40 mole % or less. If the saponification value of the PVA is higher than 40 mole %, the compatibility of the PVA with the water-soluble resin deteriorates and the resinous coating film is whitened or gelled, which prevents the resinous coating film from having a normal coating function.

It is preferable that the polymerization degree of the PVA is low. Sulfonated PVA can be preferably used to increase the solubility of the PVA in water and allow the PVA to be contained in the water-soluble resin at a high degree.

As the PVA, the following substances can be used: Gosenol, Gosenal, Gosefimer, Goserun, Gosesize (manufactured by The Nippon Synthetic Chemical Industry Co., Ltd.), Kurarepoval (manufactured by Kuraray Co., Ltd.), Denkapoval (manufactured by Denkikagaku Kogyo Co., Ltd.), Shinetsu Poval (manufactured by Shinetsu Co., Ltd.), and Yunichika Poval (manufactured by Yunichika Co. Ltd.).

It is favorable that the water-soluble resinous coating film contains polyethylene-imine in addition to the PVA to allow the water-soluble resinous coating film to adhere to the to-be-coated material at a higher degree. In this case, it is favorable that the polyethylene-imine is contained at 0.15–0.80 $g/m^2$ in the water-soluble resinous coating film to form the resinous coating film which adheres to the to-be-coated material at a high degree. If the polyethylene-imine is contained at less than $0.15/m^2$ in the water-soluble resinous coating film, the resulting resinous coating film may adhere to the to-be-coated material at a lower degree. If the polyethylene-imine is contained at more than $0.80/m^2$ in the water-soluble resinous coating film, the water-soluble resinous coating film may be gelled. It is more favorable that the water-soluble resinous coating film contains the polyethylene-imine in a range of $0.54–0.72/m^2$ to obtain a resinous coating film having a high degree of adhesiveness to the to-be-coated material.

The preferable average molecular weight of the polyethylene-imine is 800 or more. If its average molecular weight is less than 800, the resinous coating film cannot adhere to the to-be-coated material at a high degree and is frail. As the polyethylene-imine, Lupazol (manufactured by BASF Japan Co., Ltd.) and Epomine (manufactured by Nippon Shokubai Co., Ltd.) can be used.

It is preferable that the composite film contains anti-fungus agent in portions there other than the base sheet thereof to prevent the growth of fungi, bacteria, algae which have adhered to the surface of the to-be-coated material. Both inorganic and organic anti-fungus agents can be used. In the case of the inorganic anti-fungus agent, zeolite, ceramic, silver, zinc, copper, and the like having anti-fungus action are used. These substances can be used by being carried by carriers such as zeolite and ceramic silica gel. As other inorganic anti-fungus agents, optical catalyst such as titanium oxide and zinc oxide can be used singly or in combination.

As the organic anti-fungus agent, not only substances having elution action such as benzalkonium chloride, but substances not having elution action can be used. Further, it is possible to use the inorganic and organic anti-fungus agents by mixing them with each other.

The composite film may contain ultraviolet absorber in portions thereof other than the base sheet thereof to prevent the color fading of dye or pigment which may have been applied to the to-be-coated material. The ultraviolet absorber includes substances containing salicylic acid, benzophenone, benzotriazole, and cyanoacrylate. The ultraviolet absorber may be used together with ultraviolet stabilizer such as nickel dibutyl dithiocarbide and light stabilizer containing hindered amine.

The composite film can be formed by applying the water-insoluble resinous coating film to the base sheet and drying it and then the water-soluble resinous coating film to the water-insoluble resinous coating film and drying it. In addition, the layer of the water-insoluble resinous coating film and that of the water-soluble resinous coating film can be formed by tandem application of Wet-on-Wet or laminarly applied to the base sheet simultaneously. If the water-insoluble resinous coating film and/or the water-soluble resinous coating film are wet, preferably, the tandem application or the simultaneous laminar application is used.

In order to form the composite film, the surface coating material is manufactured by the following method comprising the steps of preparing a composite film having at least one water-soluble resinous coating film and a base sheet to which the water-soluble resinous coating film adheres and which passes light therethrough; applying water to a surface of the water-soluble resinous coating film or a surface of a to-be-coated material to which the water-soluble resinous coating film adheres; placing the composite film on the surface of the to-be-coated material, with the water-soluble resinous coating film confronting the surface of the to-be-coated material; irradiating a surface of the composite film with light emitted to the base sheet to harden at least one water-soluble resinous coating film and fixing the water-soluble resinous coating film confronting the surface of the to-be-coated material to the to-be-coated material by hardening it and making it water-insoluble so as to form a resinous coating film; and removing the base sheet from the water-soluble resinous coating film.

In the manufacturing method, the resinous coating film is formed on the surface of the to-be-coated material by using the composite film similar to the above-described one. Therefore, surface coating materials having various surface states can be formed. Further, because water is used instead of organic substance, the surface coating material can be formed safely and easily.

It is preferable that the surface of the base sheet is irradiated with infrared light, visible light, ultraviolet light, sun beam or electron rays to easily harden the water-caused dissolved or gelled resinous coating film.

As the light source emitting infrared light, it is possible to use those which generate electromagnetic wave having a wavelength in a region of 0.75 $\mu$m–400 $\mu$m appropriate for hardening the water-soluble resinous coating film. In the infrared region, an infrared lamp can be used as the light source, whereas in the far-infrared region, a far-infrared heater can be used as the light source.

As the light source of the visible light, it is possible to use those having a high surface temperature such as a halogen lamp, a xenon lamp, a metal halide lamp to be used only in the visible region. Visible light whose wavelength is in a range of 380–520 nm can be most favorably used to harden the resinous coating film in a preferable state.

As the light source of the ultraviolet light, a metal halide lamp and a high-pressure mercury vapor lamp can be used. It is favorable that the illumination energy of the light emitted by the light source on the illuminated surface (of base sheet) is in a range of 5 to 500 $mW/cm^2$. It is more favorable that the illumination energy of the light emitted thereby at the illuminated surface is in a range of 50 to 200 $mW/cm^2$.

The electron beam is emitted by various kinds of electron beam accelerators. Favorably, the electron beam is accelerated at an energy of 20–1000 KeV by the electron beam accelerators. More favorably, it is accelerated at an energy of 100–500 KeV thereby.

It is favorable that the application amount of the water is in a range of 1.5–10 $g/m^2$. If the application amount of the water is more than 10 $g/m^2$, the resinous coating film may be cracked. This is because the water contained in the resinous coating film vaporizes little by little after the base sheet is removed from the resinous coating film, thus gradually contracting the resinous coating film with the elapse of time.

Further, if the application amount of the water is more than 10 $g/m^2$, it is easy for the composite film to move on a thin water film when the composite film is laminated on the to-be-coated material. Consequently, it is difficult to position the composite film on the to-be-coated material at an accurate position thereof.

When the composite film is forcibly pressed against the to-be-coated material in this condition, the composite film cannot be kept flat and surface may be wavy. It occurs that in removing the base sheet from the resinous coating film of the composite film, the resinous coating film is not peeled off from the base sheet, i.e., it remains adhered to the base sheet. The reason is supposed as follows: A large amount of water causes the resinous coating film to be hardened for a long time and thus the adhesive strength of the resinous coating film to the to-be-coated material does not exceed the adhesive strength of the resinous coating film to base sheet.

If the application amount of the water is less than 1.5 $g/m^2$, air bubbles may be formed between the composite film and the to-be-coated material when the composite film is laminated on the to-be-coated material. Further, immediately after the composite film is laminated on the to-be-coated material, the water is all absorbed by the resinous coating film of the composite film and thus the composite film may adhere to the to-be-coated material in a short period of time. Thus, it is very difficult to move the composite film after the composite film is laminated on the to-be-coated material and position the composite film on the to-be-coated material at an accurate position thereof.

It is more favorable that the application amount of the water is in a range of 1.5–6 $g/m^2$. If the application amount of the water is more than 6 $g/m^2$ or less than 1.5 $g/m^2$, problems similar to those described above may occur.

It is preferable that organic solvent, surface-active agent and/or water-soluble resin are added to the water to prevent the water from being shed from the composite film and/or the to-be-coated material in applying the water thereto and thus allow the water to be applied thereto thinly and uniformly. Therefore, a small amount of water is enough to manufacture the surface coating material.

It is preferable that the boiling point of the organic substance is in a range of 30–160° C. so that the advantage obtained by adding the organic substance to the water can be more effectively displayed. The organic substance includes lower alkyl acetate such as methanol, ethanol, isopropyl alcohol, butanol, isobutanol, acetone, methyl Cellosolve, ethyl Cellosolve, butyl Cellosolve, ethyl acetate, butyl acetate; ethyl propionate, methyl isobutyl ketone, cyclohexanone, β-ethoxyethylacetate, methyl Cellosolve acetate.

As the surface active agent, nonionic surface active agent, anionic surface active agent, amphoteric surface active agent, and cationic surface active agent can be used.

The nonionic surface active agent includes saponin, derivative of alkylene oxide, derivative of glycidol, fatty esters of polyvalent alcohol, alkyl esters of starch, urethanes or ethers.

As the saponin, saponin combined with steroid can be used.

The derivative of alkylene oxide includes polyethylene glycol, condensate of polyethylene/polypropylene glycol, polyethylene glycol alkyl or alkyl aryl ether, polyethylene glycol esters, polyethylene glycol sorbitan esters, polyalkylene glycol alkyl amine or amides, and additives containing silicon and polyethylene oxide.

As the derivative of glycidol, alkenyl succinic acid polyglyceride, alkyl phenol polyglyceride.

The anionic surface active agent includes substances containing acidic groups such as carboxyl group, sulfo group, phospho group, sulfate ester group, phosphate ester group. That is, it is possible to use triterpenoid saponins, alkyl carboxylate saponins, alkyl sulfonate saponins, alkyl benzene sulfonate saponins, alkyl naphthalene sulfonate saponins, alkyl sulfate esters, alkyl phosphate, N-acyl-N-alkyl taurine acid, sulfosuccinate esters, sulfoalkyl polyoxy ethylene alkyl phenylethers, polyoxy ethylene alkyl phosphate esters.

As the amphoteric surface active agent, amino acids, amino alkyl sulphonic acids, amino alkyl sulfonic acids or phosphate esters, alkyl betaines, amine imides, and amine oxides can be used.

As the cationic surface active agent, alkyl aminesalts; aliphatic or aromatic ammonium salts ($NR_4^+X^-$; R=aliphatic or aromatic compound, X=anion substance); heterocyclic ammonium salts ($NR'_4{}^+X^-$; R=heterocyclic compound, X=anion substance) such as pyridinium, imidazolium; phosphonium or sulphonium salts containing aliphatic or heterocyclic ring.

The water-soluble resins such as pigment, adhesive agent and sticky agent having adhesive property can be used as the material of the water-soluble resinous coating film. Thus, the following substances can be used as the water-soluble resin: alkyd resin, acrylic resin, epoxy resin, urethane resin, polyvinyl alcohol, polyvinyl alcohol acetal, polyvinyl alcohol urethan, polyacrylic acid (salt), polyacrylic amide, polyvinyl methyl ether, polyvinyl pyrrolidone, polyethylene oxide, polypropylene oxide, carboxymethylcellulose, methylcellulose, ethylcellulose, hydroxymethylcellulose, alginic acid, acetylated starch, hydroxy ethylated starch, dialdehide starch, dextrin, glue, gelatine, casein.

It is preferable that the composite film has a water-insoluble resinous coating film provided between the water-soluble resinous coating film and the base sheet to freely change the shape and thickness of the surface of the resinous coating film to be formed on the surface of the to-be-coated material. Further, the resinous coating film formed can be provided with such a high degree of waterproofness and adhesiveness to the to-be-coated material that the resinous coating film can be used reliably. Further, when the resinous coating film is in contact with water or the like, the resinous coating film does not wet or swell. Thus, the resinous coating film looks beautiful and has an improved degree of waterproofness.

It is preferable that the polyethylene-imine and the polyvinyl alcohol are contained in the water-soluble resinous coating film or water, because when the water-soluble resinous coating film is irradiated in the presence of the polyethylene-imine and the polyvinyl alcohol, the water-soluble resinous coating film adheres to the surface of the to-be-coated material firmly.

It is selected appropriately according to the characteristic of the surface of the surface coating material whether the polyethylene-imine and the polyvinyl alcohol are contained in the water-soluble resinous coating film or the water.

Figure 13:
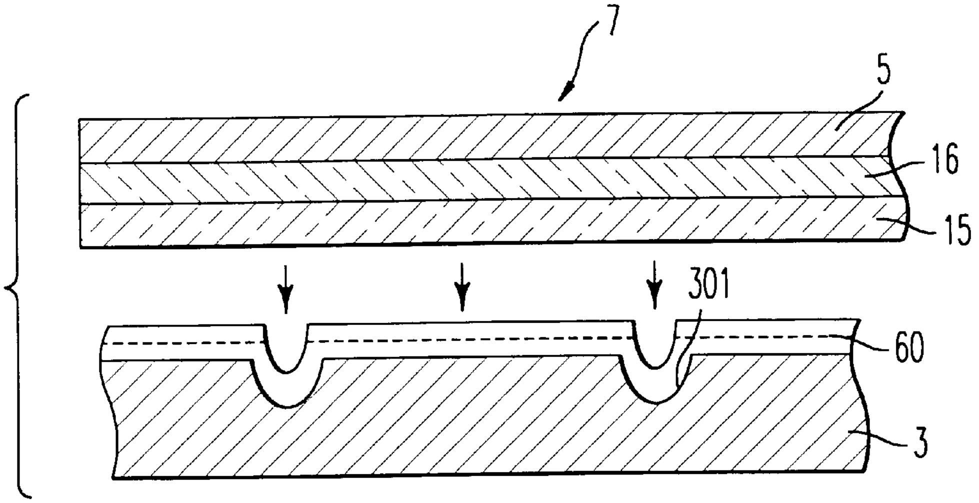
FIG. 13 is an explanatory view showing a method, of the present invention, of forming a resinous coating film on a to-be-coated material having grooves present thereon.

For example, as shown in FIG. 13, in the case of a to-be-coated material 3 whose flooring is made of wood having a comparatively deep groove 301 formed on a surface thereof, if water 60 contains the polyethylene-imine, the surface activity of the polyethylene-imine causes the water 60 to spread comparatively uniformly on the surface of the to-be-coated material 3 and uniformly penetrate into the groove 301 of the to-be-coated material 3.

Figure 14:
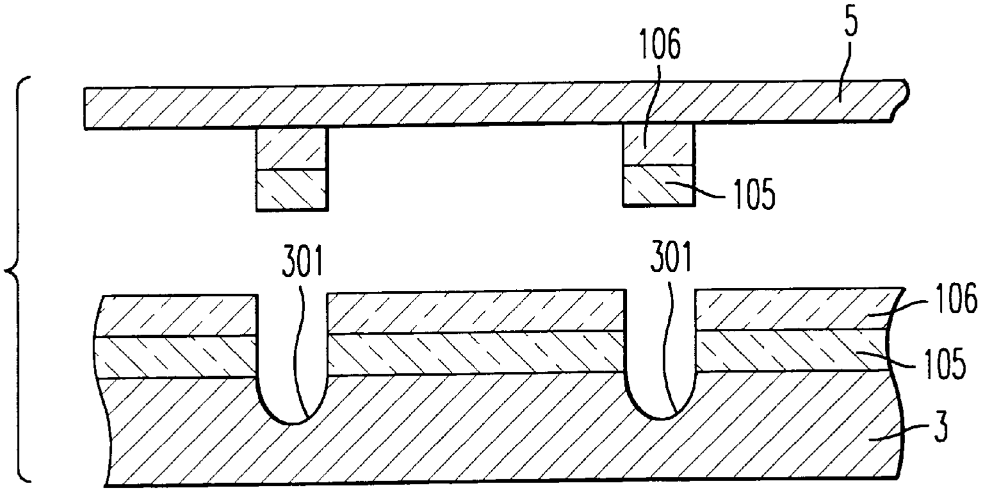
FIG. 14 is an explanatory view showing the method, following FIG. 13, of the present invention, of forming the resinous coating film on the to-be-coated material having the grooves present thereon.

The surface of the to-be-coated material 3 is coated with a composite film 7 consisting of a water-soluble resinous coating film 15, a water-insoluble resinous coating film 16, and a base sheet 5. Then, the composite film 7 is irradiated to harden the resin so as to form resin coating films 105 and 106. Referring to FIG. 14, when the base sheet 5 is removed from the resinous coating film 106, the portion of the resin coating films 105 and 106 positioned in the groove 301 is removed together with the base sheet 5 from the other portion thereof not positioned in the groove 301. As a result, the groove 301 is open to the outside. Thus, in the composite film of the present invention, the deep groove 301 formed on the flooring made of wood is not coated with the resinous coating film. That is, in this example, open pore surface finish can be accomplished.

In order to form the resinous coating film having a mirror-like surface finish, water is applied to the surface of the to-be-coated material completely and the surface of the water-soluble resinous coating film is brought into contact with the surface of the to-be-coated material completely; the water-soluble resinous coating film is completely hardened; or the water-insoluble resinous coating film is hardened so that the release interface thereof has a flat surface. As a result of the release of the base sheet from the resinous coating film, it is possible to obtain the resinous coating film having a mirror-like surface finish.

Let it be supposed that the polyvinyl alcohol is contained in water. In this case, when the water-soluble resinous coating film is brought into contact with the surface of the to-be-coated material closely, the polyvinyl alcohol contained in the water penetrates into the water-soluble resinous coating film, thus allowing the water-soluble resinous coating film to have a high degree of adhesive strength to the to-be-coated material. Therefore, the polyvinyl alcohol contained in the water contributes to the formation of the resinous coating film having a high degree of strength, similarly to the case in which it is contained in the water-soluble resinous coating film.

It is favorable the weight percentage of the PVA is 37–61 wt % with respect to the whole weight of resin contained in the water-soluble resinous coating film to allow the resinous coating film to adhere to the to-be-coated material at a high degree and have a high degree of strength. If the weight percentage of the PVA is less than 37 wt %, the degree of adhesiveness of the resinous coating film to the to-be-coated material may deteriorate. If the weight percentage of the PVA is more than 61 wt %, the strength of the resinous coating film may deteriorate and thus be frail.

It is more favorable that the weight percentage of the PVA to be contained in the water-soluble resinous coating film is 40–54 wt % with respect to the whole weight of the resin contained in the water-soluble resinous coating film to allow the resinous coating film to adhere to the to-be-coated material at a higher degree and have a higher degree of strength.

It is favorable that the water-soluble resinous coating film contains the polyethylene-imine at 0.15–0.80 $g/m^2$ to form the resinous coating film having a high degree of adhesiveness to the to-be-coated material. If the polyethylene-imine is contained at less than $0.15/m^2$ in the water-soluble resinous coating film, the resulting resinous coating film may adhere to the to-be-coated material at a lower degree. If the polyethylene-imine is contained at more than $0.80/m^2$ in the water-soluble resinous coating film, the water-soluble resinous coating film may be gelled, which may prevent a normal coating operation from normally performed.

It is favorable that water contains the polyethylene-imine at $0.015/m^2$ or more on the surface of the to-be-coated material or the surface of the composite film when the water is applied thereto to allow the resinous coating film having a high degree of adhesiveness to the to-be-coated material and having a high degree of strength. If the polyethylene-imine is contained in the water at less than $0.015/m^2$, the resulting resinous coating film may have a lower degree of adhesiveness to the to-be-coated material.

The composite film may contain anti-fungus agent in portions thereof other than the base sheet thereof to prevent the generation of microbe on the surface of the surface coating material.

The composite film may contain ultraviolet absorber in portions thereof other than the base sheet thereof to prevent the color fading of dye or pigment which may have been applied to the to-be-coated material and in addition prevent the color change in the resinous coating film.

As described above, according to the present invention, it is possible to provide the composite film capable of coating the surface of the to-be-coated material with a fine appearance and a high degree of strength by means of a mirror-like surface finish and a high-quality surface finish such as an open pore surface finish, allowing a resinous coating film having a high degree of waterproofness and adhesiveness to be formed, and easy to handle; and provide a method of manufacturing the surface coating material formed of the composite film.

EMBODIMENTS

Embodiment 1

The surface coating material of embodiment 1 is described below with reference to FIG. 1.

As shown in FIG. 1, the surface coating material of embodiment 1 comprises a water-insoluble resinous coating film 101 formed on a surface of a to-be-coated material 3. In order to form the water-insoluble resinous coating film 101, after a water-soluble resinous coating film 10 is brought into contact with the to-be-coated material 3 closely through water, the water-soluble resinous coating film 10 is irradiated with ultraviolet rays to harden it and make it water-insoluble to adhere it to the surface of the to-be-coated material 3.

The method of manufacturing the surface coating material is described below.

Figure 2:
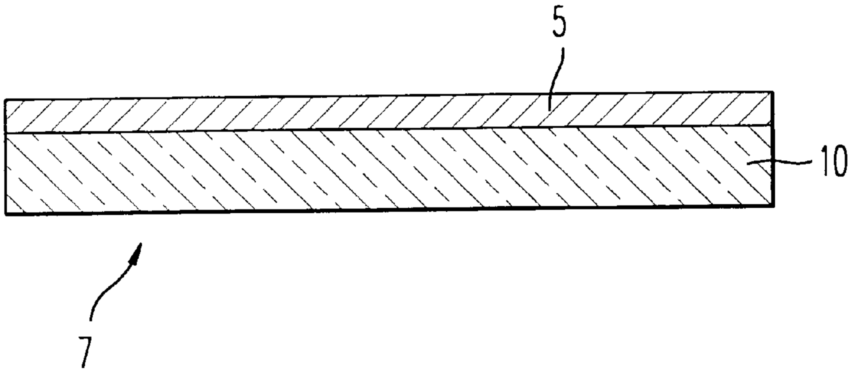
FIG. 2 is an explanatory sectional view showing a composite film according to embodiment 1.

Initially, water-soluble resin is applied to a base sheet 5 by means of an applicator to form the water-soluble resinous coating film 10 having a Wet thickness of 100 μm, as shown in FIG. 2.

The water-soluble resinous coating film 10 consists of water-soluble resin containing a reactive compound having vinyl groups and functional group; reaction initiator; and hardener. As the reactive compound, Aronix TO-1343 (manufactured by Toa Gosei Chemical Industry Co., Ltd.) and Aronix M5700 (manufactured by Toa Gosei Chemical Industry Co., Ltd.) were used. As the reaction initiator, Darocure 1173 (manufactured by CIBA GEIGY(Japan) Co., Ltd.) was used. As the hardener, Coronate L (manufactured by Nippon Polyurethane Industry Co., Ltd.) was used. The Coronate L contained 75 wt % of resin and 25 wt % of ethyl ether.

The water-soluble resin contained 70 parts by weight of Aronix TO-1343, 30 parts by weight of Aronix M5700, 2 parts by weight of Darocure 1173, and 10 parts by weight of Coronate L.

The water-soluble resin was used by diluting 112 parts by weight thereof with 10 parts by weight of butyl acetate ester.

As the base sheet 5, a film of polyethylene terephthalate (Lumilor T-type manufactured by Toray Co., Ltd.) having a thickness of 50 μm was used.

Then, the water-soluble resinous coating film 10 was dried at 30° C. so that it had a thickness of 90 μm. In this manner, a composite film 7 consisting of the base sheet 5 and one layer of the water-soluble resinous coating film 10 which adhered to the base sheet 5 was obtained, as shown in FIG. 2.

Figure 3:
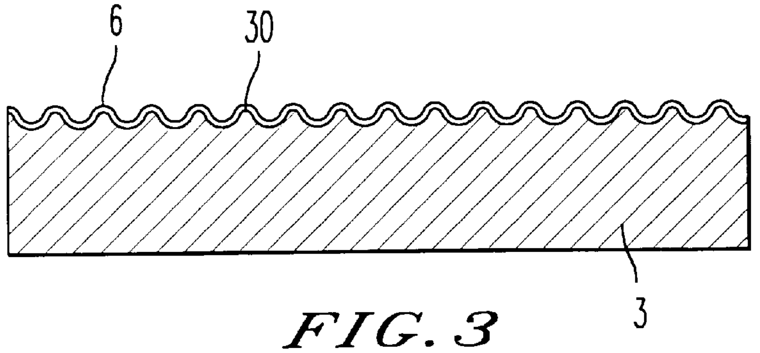
FIG. 3 is an explanatory sectional view showing a base sheet, according to embodiment 1, to which water has been applied.
Figure 4:
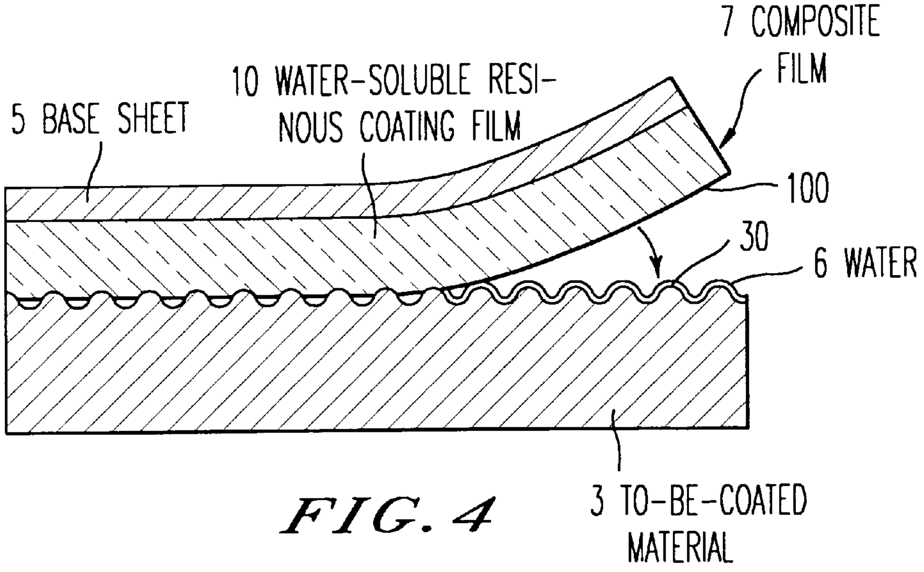
FIG. 4 is an explanatory view showing a method, according to embodiment 1, of placing the composite film on the base sheet in close contact therewith.
Figure 5:
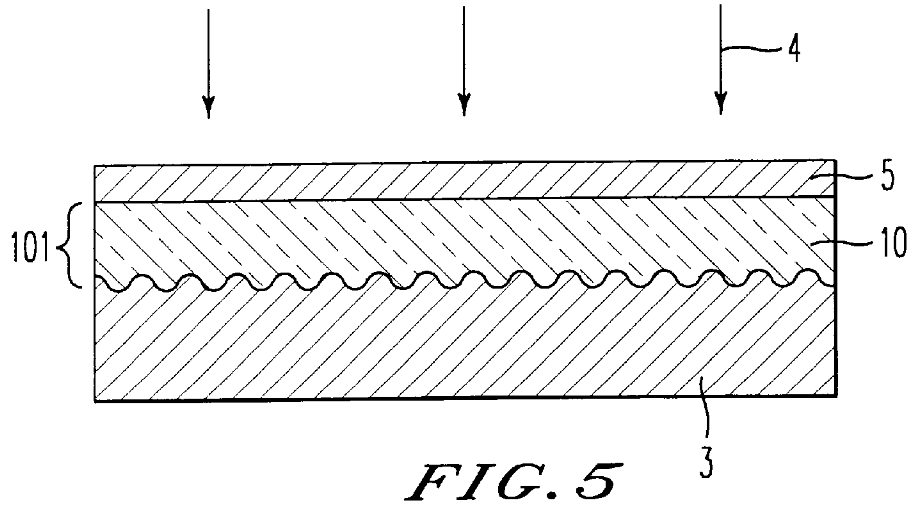
FIG. 5 is an explanatory view showing a method, according to embodiment 1, of hardening a water-soluble resinous coating film.

Then, 30 g/$m^2$ of water 6 was applied to an irregular surface 30 of a plate, made of oak, used as the to-be-coated material 3, as shown in FIG. 3. In this process, the amount of water actually applied to the irregular surface 30 was 10 g/$m^2$ or less as the most of water spilled at this time. Then, as shown in FIG. 4, the composite film 7 was placed on the irregular surface 30 of the plate immediately. Then, a rubber roller (No. 4, manufactured by Otsuka Brush Manufacturing Co., Ltd.) was pressed against the composite film 7. Consequently, a surface 100 of the water-soluble resinous coating film 10 was brought into close contact with the irregular surface 30 through the water 6. At this time, the water-soluble resinous coating film 10 swelled due to the presence of water, thus gelling.

Thereafter, the water-soluble resinous coating film 10 was dried at 30° C. for 30 minutes.

Then, using a high-pressure mercury vapor lamp (H05-L21: manufactured by Eye Graphics Co., Ltd.) as the light source of ultraviolet rays, the surface of the base sheet 5 of the composite film 7 was irradiated with ultraviolet rays 4 whose amount of light was 4,000 mJ. As a result, the ultraviolet rays 4 reached the water-soluble resinous coating film 10 through the base sheet 5, thus hardening the water-soluble resinous coating film 10 and making it water-insoluble to form a resinous coating film 101.

Then, the base sheet 5 was peeled off from the resinous coating film 101 to obtain a surface coating material 9 having mirror-like surface finish.

As shown in FIG. 1, the surface coating material 9 had a mirror-like surface finish 19, namely, a beautiful glossy surface. No air bubbles or wrinkles were found on the resinous coating film 101. Further, it was found that the bonding strength of the resinous coating film 101 was high because no peeling was observed thereon in a 1 mm cross cut test.

Embodiment 2

Figure 6:
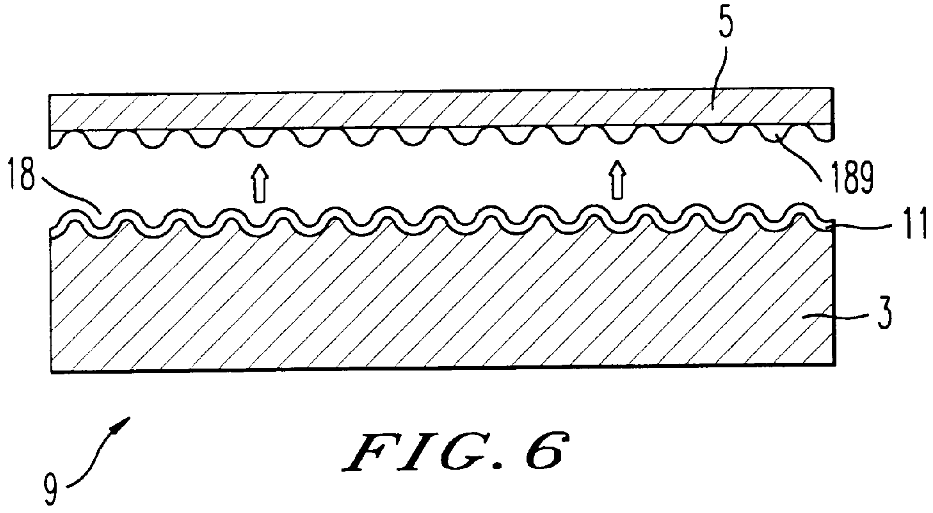
FIG. 6 is an explanatory view showing a surface coating material according to embodiment 2.

As shown in FIG. 6, in the surface coating material of embodiment 2, a resinous coating film 11 having an irregular surface 18 is formed on a to-be-coated material 3.

That is, initially, water-soluble resin was applied to a surface of a base sheet by means of an applicator to form a water-soluble resinous coating film having a Wet thickness of 30 μm. The water-soluble resin was a mixture of 30 parts by weight of Karayad RM1001 (manufactured by Nippon Kayaku Co., Ltd.) serving as a reactive compound having vinyl groups; two parts by weight of Darocure 1173 (manufactured by CIBA GEIGY(Japan) Co., Ltd.) serving as reaction initiator; 40 parts by weight of Aroron 460 (manufactured by Nippon Shokubai Co., Ltd.) serving as water-soluble acrylic resin; and 30 parts by weight of isopropyl alcohol serving as diluting solvent.

The Aroron 460 contained 50 wt % of resin, ethanol, isopropanol, and water.

Then, the water-soluble resinous coating film was dried at 30° C. so that it had a thickness of 15 μm. In this manner, a composite film consisting of the base sheet and one layer of the water-soluble resinous coating film which adhered thereto was obtained.

Then, using the composite film, a surface coating material was manufactured by a method similar to that of embodiment 1.

As shown in FIG. 6, the surface coating material 9 had a beautiful appearance and feel of a natural wood peculiar to the open pore surface finish. Further, no air bubbles or wrinkles were found on the surface coating material 9. Furthermore, it was found that the bonding strength of the resinous coating film was high because no peeling was observed thereon in a 1 mm cross cut test.

Further, a part of the resinous coating film 11 was left on the surface of the base sheet 5 peeled off from the resinous coating film and many resinous irregularities 189 having a shape and size similar to the shape and size of capillary tubes present on the irregular surface 18 of the to-be-coated material 3.

Embodiment 3

Figure 7:
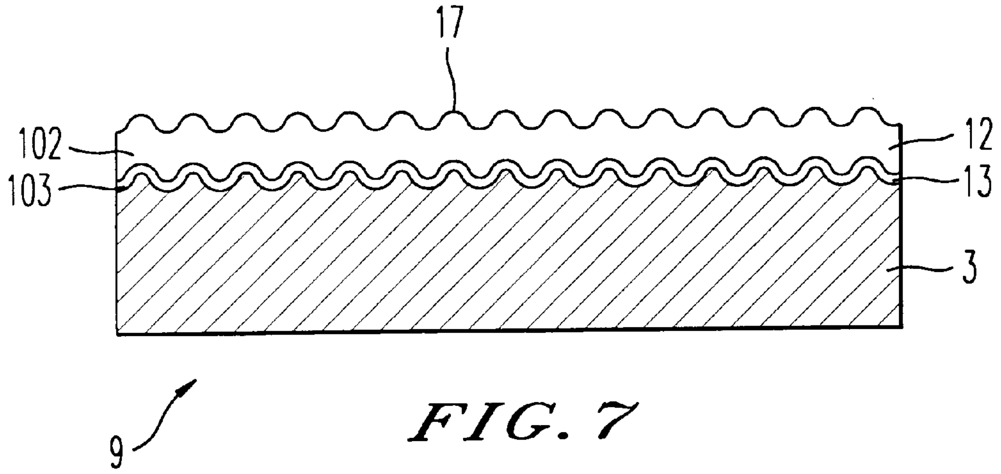
FIG. 7 is a explanatory sectional view showing a surface coating material according to embodiment 3.
Figure 8:
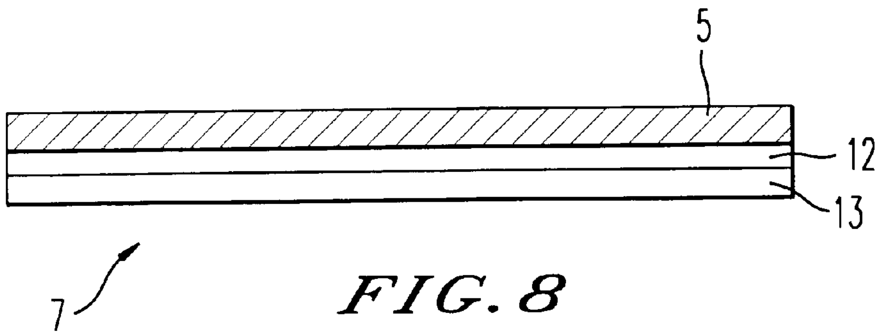
FIG. 8 is a explanatory sectional view showing a composite film according to embodiment 3.

As shown in FIGS. 7 and 8, after water was applied to a surface of a to-be-coated material 3, first and second water-soluble resinous coating films 12 and 13 were placed on the surface of the to-be-coated material 3 and then, irradiated with ultraviolet rays to harden them. As a result, resinous coating films 102 and 103 were formed.

The method of manufacturing the surface coating material of embodiment 3 is described in detail below.

Initially, water-soluble resin was applied to a surface of a base sheet 5 by means of an applicator to form a first water-soluble resinous coating film 12 having a Wet thickness of 30 μm, as shown in FIG. 8. The water-soluble resin was a mixture of 80 parts by weight of Aronix TO-1343 (manufactured by Toa Gosei Chemical Industry Co., Ltd.) serving as a reactive compound having vinyl groups and functional group; 20 parts by weight of Aronix M5700 (manufactured by Toa Gosei Chemical Industry Co., Ltd.) serving as a reactive compound having the vinyl groups and the functional group; two parts by weight of Darocure 1173 (manufactured by CIBA GEIGY(Japan) Co., Ltd.) serving as reaction initiator; and 10 parts by weight of butyl acetate ester serving as diluting solvent. Subjected to the irradiation of ultraviolet rays, the water-soluble resin is hardened.

As the base sheet 5, a film of polyethylene terephthalate (Lumilor T-type manufactured by Toray Co., Ltd.) having a thickness of 50 μm was used.

Then, the first water-soluble resinous coating film 12 was dried at 30° C. so that it had a thickness of 27 μm. In this manner, the first water-soluble resinous coating film 12 adhered to the base sheet 5.

Then, water-soluble resin was applied to a surface of the first water-soluble resinous coating film 12 by means of an applicator to form the second water-soluble resinous coating film 13 having a Wet thickness of 20 μm. The water-soluble resin is water-soluble adhesive agent consisting of a water solution containing 10 wt % of polyvinyl alcohol (Gosenol NH-18: manufactured by The Nippon Synthetic Chemical Industry Co., Ltd.). The water-soluble resin is hardened not by the irradiation of light but by removing absorbed water therefrom by drying the water.

Then, the second water-soluble resinous coating film 13 was dried at 30° C. so that it had a thickness of 2 μm. As a result, the second water-soluble resinous coating film 13 adhered to the first water-soluble resinous coating film 12. In this manner, a composite film 7 consisting of the base sheet 5, the first water-soluble resinous coating film 12 which adhered to the surface of the base sheet 5, and the second water-soluble resinous coating film 13 which adhered to the first water-soluble resinous coating film 12 was obtained.

Then, similarly to embodiment 1, water was applied to the surface of the to-be-coated material 3, and then, the composite film 7 was placed on the to-be-coated material 3. Then, a rubber roller being pressed against the composite film 7, the composite film 7 was irradiated with ultraviolet rays to harden the first water-soluble resinous coating film 12. The second water-soluble resinous coating film 13 was dried to harden it. Then, the base sheet 5 was peeled off from the first water-soluble resinous coating film 12. In this manner, the surface coating material 9 of embodiment 3 was obtained.

As shown in FIG. 7, the surface coating material 9 thus obtained had a gentle irregular surface 17, thus having feeling characteristic of the open pore surface finish. That is, the surface coating material 9 had a beautiful appearance and feel of a natural wood and a beautiful glossy mirror-like surface finish. Further, no air bubbles or wrinkles were found on the surface coating material 9. Furthermore, it was found that the bonding strength of the resinous coating film was high because no peeling was observed thereon in a 1 mm cross cut test.

Embodiment 4

Figure 9:
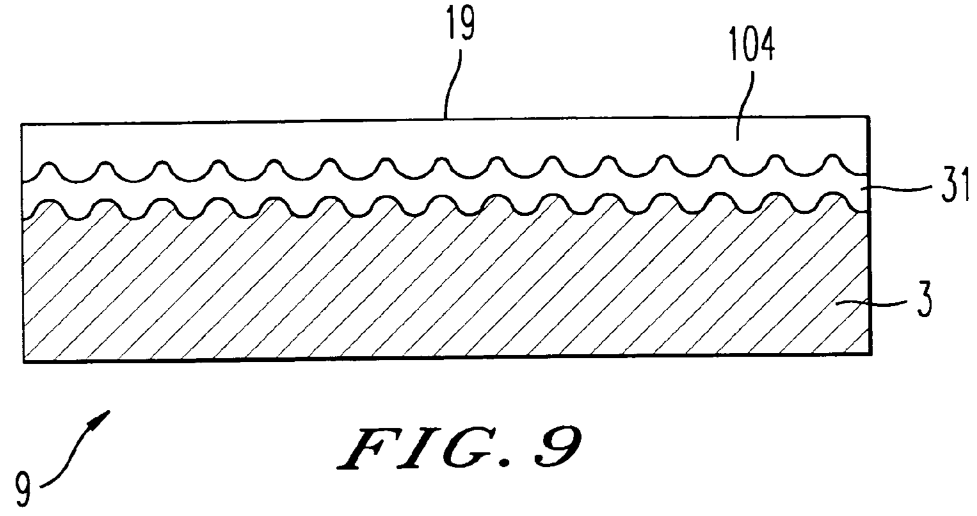
FIG. 9 is an explanatory sectional view showing a surface coating material according to embodiment 4.

As shown in FIG. 9, the surface coating material of embodiment 4 has a one layer of a resinous coating film 104 formed on a coating film 31 which coated a to-be-coated material 3.

The method of manufacturing the surface coating material of embodiment 4 is described in detail below.

Initially, water-soluble resin was applied to a base sheet by means of an applicator to form a water-soluble resinous coating film 14 having a Wet thickness of 50 μm. The water-soluble resin was a mixture of 70 parts by weight of Aronix TO-1343 (manufactured by Toa Gosei Chemical Industry Co., Ltd.) serving as a reactive compound having vinyl groups and functional group; 30 parts by weight of Aronix M5700 (manufactured by Toa Gosei Chemical Industry Co., Ltd.) serving as a reactive compound having the vinyl groups and the functional group; two parts by weight of Darocure 1173 (manufactured by CIBA GEIGY (Japan) Co., Ltd.), 10 parts by weight of Coronate L as a hardener serving as reaction initiator; and 10 parts by weight of butyl acetate ester serving as diluting solvent.

As the base sheet, a film of polyethylene terephthalate (Lumilor T-type manufactured by Toray Co., Ltd.) having a thickness of 50 μm was used.

Then, the water-soluble resinous coating film 14 was dried at 30° C. so that it had a thickness of 45 μm. In this manner, a composite film consisting of the base sheet and one layer of the water-soluble resinous coating film 14 which adhered to the base sheet was obtained.

Figure 10:
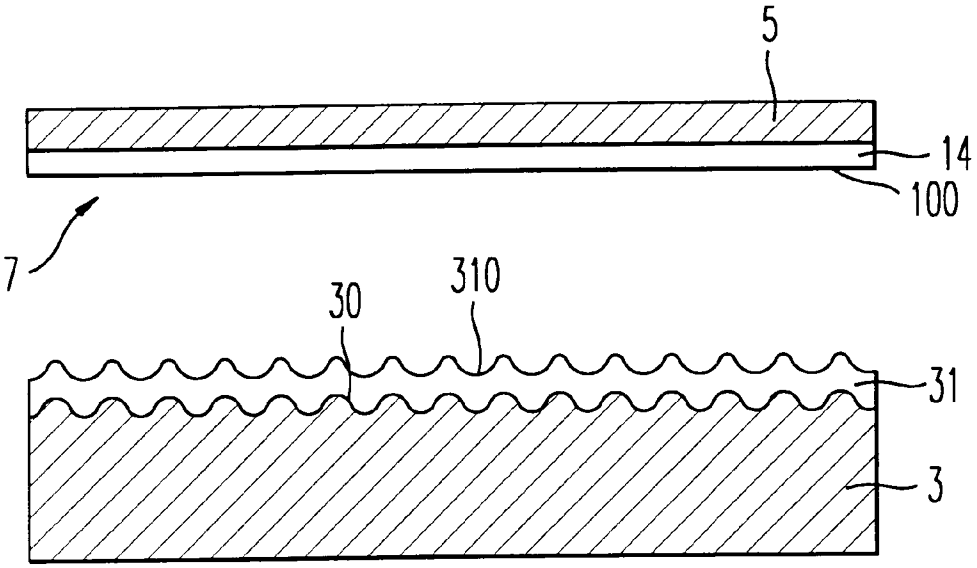
FIG. 10 is an explanatory view showing a method, according to embodiment 4, of manufacturing a surface coating material.

Then, Urethane Clear (UC-11 Floor Ulet, manufactured by Gengen Kagaku Kogyo Co., Ltd.) was applied to an irregular surface 30 of an oak veneer used as the to-be-coated material 3, as shown in FIG. 10 to form a coating film 31.

Then, a surface of the coating film 31 was polished with sand paper #400 (CC400Cw: manufactured by Cobacks Co., Ltd.). Immediately after 30 $g/m^2$ of water was applied to the polished surface 310 of the coating film 31, the composite film 7 was placed on the irregular surface 30. In this process, the amount of water actually applied to the surface of the coating film 31 was 10 $g/m^2$ or less as the most of water spilled at this time. Then, a rubber roller (No. 4, manufactured by Otsuka Brush Manufacturing Co., Ltd.) was pressed against the composite film 7 to press the composite film 7 against the to-be-coated material 3. Consequently, a surface 100 of the water-soluble resinous coating film 14 was brought into contact with the polished surface 310 of the coating film 31 closely through the water.

Thereafter, the water-soluble resinous coating film 14 was dried at 30° C. for 30 minutes to dry it.

Then, using a high-pressure mercury vapor lamp (H05-L21: manufactured by Eye Graphics Co., Ltd.) as the light source of ultraviolet rays, the composite film was irradiated with ultraviolet rays whose amount of light was 4,000 mJ. As a result, the ultraviolet rays reached the water-soluble resinous coating film 14 through the base sheet 5, thus hardening the water-soluble resinous coating film 14 and making it water-insoluble to form a resinous coating film 104.

Then, the base sheet 5 was peeled off from the resinous coating film 104 to obtain a surface coating material having mirror-like surface finish.

As shown in FIG. 9, the surface coating material 9 had a mirror-like surface finish 19, namely, a glossy surface. No air bubbles or wrinkles were observed on the resinous coating film 104. Further, it was found that the bonding strength of the resinous coating film 104 was high because no peeling was observed thereon in a 1 mm cross cut test.

Embodiment 5

In embodiment 5, a water-soluble resinous coating film was irradiated with visible light to harden it so as to form a resinous coating film.

The method of manufacturing the surface coating material is described in detail below.

Initially, water-soluble resin was applied to a base sheet by means of an applicator to form the water-soluble resinous coating film having a Wet thickness of 50 μm. The water-soluble resin was a mixture of 100 parts by weight of Beamset AQ-7 (manufactured by Arakawa Kagaku Co., Ltd.) serving as a reactive compound having vinyl groups and functional group; five parts by weight of Irgacure 369 (manufactured by CIBA GEIGY(Japan) Co., Ltd.) serving as reaction initiator; and 10 parts by weight of the Coronate L (manufactured by Nippon Polyurethane Kogyo Co., Ltd.) serving as hardener; and 10 parts by weight of butyl acetate ester serving as diluting solvent.

As the base sheet, a film of polyethylene terephthalate (Lumilor T-type manufactured by Toray Co., Ltd.) having a thickness of 50 μm was used.

Then, the water-soluble resinous coating film was dried at 30° C. so that it had a thickness of 45 μm. As a result, a composite film consisting of the base sheet and one layer of the water-soluble resinous coating film which adhered to the base sheet was obtained.

Then, 30 $g/m^2$ of water was applied to an irregular surface of an oak veneer used as a to-be-coated material. In this process, the amount of water actually applied to the irregular surface was 10 $g/m^2$ or less as the most of water spilled at this time. Immediately after the application, the composite film was placed on the irregular surface. Then, a rubber roller (No. 4, manufactured by Otsuka Brush Manufacturing Co., Ltd.) was pressed against the composite film to press the composite film against the to-be-coated material. Consequently, a surface of the water-soluble resinous coating film was brought into close contact with the irregular surface of the to-be-coated material through the water.

Thereafter, the water-soluble resinous coating film was dried at 30° C. for 30 minutes to dry the water-soluble resinous coating film.

Then, the base sheet of the composite film was placed 5 cm apart from a visible light-emitting source with the a base sheet forming a right angle with the light source to irradiate the composite film with visible light for five minutes. As a result, the water-soluble resinous coating film was hardened. As the visible light-emitting source, a fluorescent tube (Mitsubishi Lupika: manufactured by Mitsubishi Denki Co., Ltd.) was used.

Then, the base sheet was peeled off from the resinous coating film to obtain a surface coating material having semi-open pore surface finish.

The surface coating material thus obtained had a gentle irregular surface, thus having the feeling characteristic of the open pore surface finish. That is, the surface coating material had a beautiful appearance and feel of a natural wood and a beautiful glossy mirror-like surface finish. Further, no air bubbles or wrinkles were found on the surface coating material. Furthermore, it was found that the bonding strength of the resinous coating film was high because no peeling was observed thereon in a 1 mm cross cut test.

Embodiment 6

In embodiment 6, a water-soluble resinous coating film was irradiated with sun beams to harden it so as to form a resinous coating film.

The method of manufacturing the surface coating material of embodiment 6 is described in detail below.

Initially, water-soluble resin was applied to a base sheet by means of an applicator to form the water-soluble resinous coating film having a Wet thickness of 100 $\mu$m. The water-soluble resin was a mixture of 70 parts by weight of Aronix TO-1343 (manufactured by Toa Gosei Chemical Industry Co., Ltd.) serving as a reactive compound having vinyl groups and functional group; 30 parts by weight of Aronix M5700 (manufactured by Toa Gosei Chemical Industry Co., Ltd.) serving as a reactive compound having vinyl groups and functional group; five parts by weight of Irgacure 369 (manufactured by CIBA GEIGY(Japan) Co., Ltd.) serving as reaction initiator; 10 parts by weight of Coronate L (manufactured by Nippon Polyurethane Industry Co., Ltd.) serving as hardener; and 10 parts by weight of butyl acetate ester serving as diluting solvent.

As the base sheet, a film of polyethylene terephthalate (Lumilor T-type manufactured by Toray Co., Ltd.) having a thickness of 50 $\mu$m was used.

Then, the water-soluble resinous coating film was dried at 30° C. so that it had a thickness of 90 $\mu$m. As a result, a composite film consisting of the base sheet and one layer of water-soluble resinous coating film which adhered to the base sheet was obtained.

Then, 30 g/m$^2$ of water was applied to an irregular surface of an oak veneer used as a to-be-coated material. In this process, the amount of water actually applied to the irregular surface of the oak plate was 10 g/m$^2$ or less as the most of water spilled at this time. Immediately after the application, the composite film was placed on the irregular surface. Then, a rubber roller (No. 4, manufactured by Otsuka Brush Manufacturing Co., Ltd.) was pressed against the composite film to press the composite film against the to-be-coated material. Consequently, a surface of the water-soluble resinous coating film was brought into close contact with the irregular surface of to-be-coated material through the water.

Thereafter, the water-soluble resinous coating film was dried at 30° C. for 30 minutes to dry the water-soluble resinous coating film.

Then, the base sheet of the composite film was placed, with the base sheet forming a right angle with the sun beam to irradiate the composite film with the sun beams for two minutes. As a result, the water-soluble resinous coating film was hardened.

Then, the base sheet was peeled off from the resinous coating film to obtain a surface coating material having the semi-open pore surface finish.

The surface coating material thus obtained had a beautiful appearance and the feel of a natural wood and in addition, a beautiful glossy mirror-like surface finish. Further, no air bubbles or wrinkles were found on the surface coating material. Furthermore, it was found that the bonding strength of the resinous coating film was high because no peeling was observed thereon in a 1 mm cross cut test.

Embodiment 7

In embodiment 7, a water-soluble resinous coating film having a colored layer was formed from a water-soluble resinous coating film to which colorant was added.

The method of manufacturing the surface coating material of embodiment 6 is described in detail below.

Initially, water-soluble resin was applied to a base sheet by means of an applicator to form the water-soluble resinous coating film having a Wet thickness of 50 $\mu$m. The water-soluble resin was a mixture of 70 parts by weight of Aronix TO-1343 (manufactured by Toa Gosei Chemical Industry Co., Ltd.) serving as a reactive compound having vinyl groups and functional group; 30 parts by weight of Aronix M5700 (manufactured by Toa Gosei Chemical Industry Co., Ltd.) serving as a reactive compound having the vinyl groups and the functional group; three parts by weight of Lucilin TPO (manufactured by BASF Japan Co., Ltd.) serving as reaction initiator; 10 parts by weight of Coronate L (manufactured by Nippon Polyurethane Industry Co., Ltd.) serving as hardener; and one part by weight of TR651 BROWN N (manufactured by Toyo Ink MEG Co., Ltd.) serving as colorant; and 10 parts by weight of butyl acetate ester serving as diluting solvent.

As the base sheet, a film of polyethylene terephthalate (Lumilor T-type manufactured by Toray Co., Ltd.) having a thickness of 50 $\mu$m was used.

Then, the water-soluble resinous coating film was dried at 30° C. so that it had a thickness of 45 $\mu$m. As a result, a composite film consisting of the base sheet and the colorant-contained one layer of the water-soluble resinous coating film which adhered to the base sheet was obtained.

Then, using the composite film, a surface coating material was manufactured by a method similar to that of embodiment 1.

The surface coating material thus obtained had a gentle colored irregular surface, thus having feeling characteristic of the open pore surface finish. That is, the surface coating material had a beautiful appearance and feel of a natural wood and a beautiful glossy mirror-like surface finish. Further, no air bubbles or wrinkles were found on the surface coating material. Furthermore, it was found that the bonding strength of the resinous coating film was high because no peeling was observed thereon in a 1 mm cross cut test.

Embodiment 8

In embodiment 8, the amount of water was changeably applied to a surface of a to-be-coated material to observe the coating state of a resinous coating film.

A surface of the to-be-coated material was coated with the resinous coating film as follows: Initially, as a base sheet, a film of polyethylene terephthalate (Lumilor T-type manufactured by Toray Co., Ltd.) having a thickness of 50 $\mu$m was prepared. Water-soluble resin was applied to a surface of the base sheet by means of an applicator to form the water-soluble resinous coating film having a Wet thickness of 30 $\mu$m.

The water-soluble resinous coating film consisted of 100 parts by weight of reactive compounds of two kinds having vinyl groups and functional group; three parts by weight of reaction initiator; 10 parts by weight of hardener; and 10 parts by weight of diluting solvent. The reactive compounds consisted of 70 parts by weight of the Aronix TO-1343 (manufactured by Toa Gosei Chemical Industry Co., Ltd.); 30 parts by weight of the Karayad RM1001 (manufactured by Nippon Kayaku Co., Ltd.). As the reaction initiator, the Darocure 1173 (manufactured by CIBA GEIGY(Japan) Co., Ltd.) was used. As the hardener, the Coronate L (manufactured by Nippon Polyurethane Industry Co., Ltd.)

was used. The Coronate L consisted of 75 wt % of resin and 25 wt % of acetic acid ethyl ester. As the diluting agent, butyl acetate ester was used.

Then, the water-soluble resinous coating film was dried at 30° C. to obtain a composite film comprising one layer of the water-soluble resinous coating film having a thickness of 26 μm.

Then, Urethane Clear (UC-11 Floor Ulet, manufactured by Gengen Kagaku Kogyo Co., Ltd.) was applied to a surface of a piece of wood used as the to-be-coated material. Then, the surface thereof was polished with sand paper #400 (CC400Cw: manufactured by Cobacks Co., Ltd.). In this manner, the to-be-coated material having the coating film formed on the surface thereof was obtained.

Immediately after 1 $g/m^2$–18 $g/m^2$ of water was applied to the polished surface of the coating film, the composite film was placed thereon carefully not to form air bubbles on the polished surface of the composite film and further, the peripheral four sides was sealed to prevent the water from being splashed.

Then, using a high-pressure mercury vapor lamp (H05-L21: manufactured by Eye Graphics Co., Ltd.) as the light source of ultraviolet rays, the composite film was irradiated with ultraviolet rays whose amount of light was 4,000 mJ to harden the water-soluble resinous coating film. Then, the base sheet was peeled off from resinous coating film. As a result, surface coating materials each consisting of the resinous coating film which adhered to the surface of the to-be-coated material were obtained. The surface coating materials thus obtained were classified into specimens 1–5 according to the amount of water applied to the surface of the to-be-coated material.

The coating state of the resinous coating film of the surface coating material was observed. As shown in table 1, observed items were the generation of bubble between the to-be-coated material and the resinous coating film, the crack of the resinous coating film, the flatness degree of the surface of the resinous coating film, and the positioning accuracy of the resinous coating film. These observed items were evaluated as "inferior", "average", "fine", and "excellent" and marked as X, Δ, ○ and ◎, respectively.

As indicated in table 1, when the application amount of water was 6 $g/m^2$ (specimen 3), the resinous coating film had a beautiful glossy mirror-like surface and no bubbles and wrinkles were observed. When the application amount of water was 1.5 $g/m^2$ (specimen 2) and 10 $g/m^2$ (specimen 4), each of the resinous coating films had also a beautiful glossy mirror-like surface.

When the application amount of water was 1 $g/m^2$ (specimen 1), bubbles were formed on the resinous coating film and the resinous coating film did not have a uniform thickness. Further, it was difficult to place the composite film in position. When the application amount of water was 18 $g/m^2$ (specimen 5), it was difficult to place the composite film in position, and the surface of the resinous coating film was wavy. Further, the resinous coating film was racked and was non-uniform in its thickness.

TABLE 1

| specimen NO. | amount of applied water | generation of bubble | crack | flatness degree | positioning accuracy |
|---|---|---|---|---|---|
| 1 | 1 $g/m^2$ | X | ◎ | ◎ | Δ |
| 2 | 1.5 $g/m^2$ | ◎ | ◎ | ◎ | ◎ |
| 3 | 6 $g/m^2$ | ◎ | ◎ | ◎ | ◎ |

TABLE 1-continued

| specimen NO. | amount of applied water | generation of bubble | crack | flatness degree | positioning accuracy |
|---|---|---|---|---|---|
| 4 | 10 $g/m^2$ | ◎ | ○ | ○ | ○ |
| 5 | 18 $g/m^2$ | ◎ | X | X | X |

Embodiment 9

The surface coating material of embodiment 9 is described below with reference to FIGS. 11 and 12.

Figure 11:
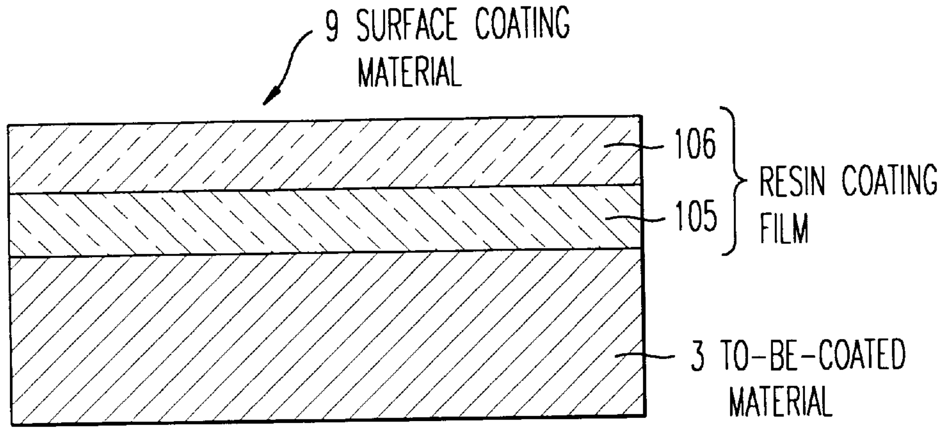
FIG. 11 is an explanatory view showing a surface coating material according to embodiment 9.

As shown in FIG. 11, in the surface coating material 9 of embodiment 9, resinous coating films 105 and 106 were formed on a surface of a to-be-coated material 3. To form the resinous coating film 105, after a water-soluble resinous coating film is brought into close contact with a surface of the to-be-coated material 3 through water containing polyethylene-imine, the water-soluble resinous coating film was irradiated with ultraviolet rays to harden and make it water-insoluble. As a result, the water-soluble resinous coating film adhered to the surface of the to-be-coated material 3. The resinous coating film 106 was formed by hardening a water-insoluble resinous coating film.

Figure 12:
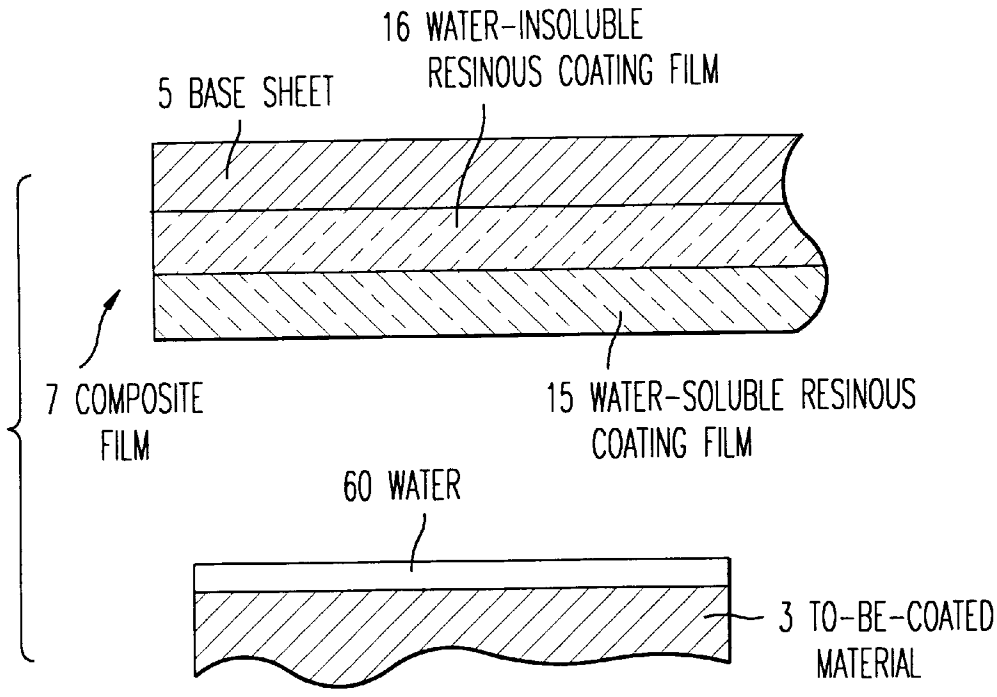
FIG. 12 is an explanatory view showing a method, according to embodiment 9, of manufacturing a surface coating material.

As shown in FIG. 12, the method of manufacturing the surface coating material comprises the step of manufacturing a composite film 7 by coating water-insoluble resinous coating film 16 and water-soluble resinous coating film 15 to the base sheet 5; applying water 60 containing polyethylene imine to a surface of to-be-coated material 3; and coating composite film by placing the composite film 7 on the water applied to-be-coated material 3 and removing the base sheet 5 from the resinous coating film. Each step is described below in detail.

(1) Process of Manufacturing Composite Film

As a base sheet 5, a film of polyethylene terephthalate (Lumilor T-type manufactured by Toray Co., Ltd.) having a Wet thickness of 50 μm was used. Water-insoluble resin 16 was applied to the base sheet by means of an applicator to form a water-soluble resinous coating film 15 having a Wet thickness of 50 μm.

The water-insoluble resinous coating film 16 contained 70 parts by weight of Hitaloid 7850 (manufactured by Hitachi Kasei Kogyo Co., Ltd.); 30 parts by weight of Aronix M350 (manufactured by Toa Gosei Chemical Industry Co., Ltd.); four parts by weight of Darocure 1173 (manufactured by CIBA GEIGY(Japan) Co., Ltd.); and 200 parts by weight of Hitaloid 3079 (solution containing 50 wt % of mixture of toluene, xylene, and butyl acetate ester: manufactured by Hitachi Kasei Kogyo Co., Ltd.).

Then, the water-insoluble resinous coating film 16 were half-dried at 30° C. so that they had a thickness of 31 μm, respectively.

Nine kinds of water-soluble resins 15 containing different PVA concentration were sequentially applied to the surface of the water-insoluble resinous coating film 16 by means of an applicator. The nine kinds of water-soluble resinous coating films have a Wet thickness of 50 μm.

As the mixing proportion of the water-soluble resin, the part by weight of Aronix TO-1343 (manufactured by Toa Gosei Chemical Industry Co., Ltd.), Karayad RM1001 (manufactured by Nippon Kayaku Co., Ltd.), and Darocure 1173 were kept at constant parts by weight, namely, 70, 30, and 4, respectively, whereas 40% methanol solution of Goselan L-0301 (manufactured by The Nippon Synthetic Chemical Industry Co., Ltd.) which was PVA was varied to nine kinds of parts by weight, namely, 100, 125, 150, 175, 200, 250, 300, 350, and 400.

Then, the water-soluble resinous coating film was dried at 30° C. to form nine water-soluble resinous coating films having drying-caused different thicknesses. In this manner, nine composite films each consisting of one layer of the water-insoluble resinous coating film and one layer of the water-soluble resinous coating film containing a PVA different in its concentration were obtained.

(2) Water-applying Process

Then, Toyo Color Floor Lead II (manufactured by Toyo Plywood Co., Ltd.) was prepared as a flooring, namely, a to-be-coated material. 3 g of a water solution containing one wt % of polyethylene-imine (Lupazol WF: manufactured by BASF Co., Ltd.) was applied to a surface of the to-be-coated material per $m^2$. Thus, 0.03 g of the polyethylene-imine was applied to the surface of the to-be-coated material per $m^2$.

(3) Composite film-coating process

Immediately after the polyethylene-imine was applied to the flooring, namely, the to-be-coated material, a composite film was placed on the flooring surface. Then, using a rubber roller (No. 4, manufactured by Otsuka Brush Manufacturing Co., Ltd.), the composite film was pressed against the to-be-coated material. As a result, the surface of the water-soluble resinous coating film of the composite film was brought into contact with the flooring surface closely through the polyethylene-imine-contained water solution.

Thereafter, the water-soluble resinous coating film was dried at 30° C. for 30 minutes to dry it. Then, using the high-pressure mercury vapor lamp (H05-L21: manufactured by Eye Graphics Co., Ltd.) as the light source of ultraviolet rays, the surface of the base sheet of the composite film was irradiated with ultraviolet rays whose amount of light was 4,000 mJ. The ultraviolet rays reached the water-insoluble resinous coating film and the water-soluble resinous coating film through the base sheet, thus hardening both coating films shown in FIG. 11 to form the resinous coating films 105 and 106.

Then, the base sheet 5 was peeled off from the resinous coating films 105 and 106 to obtain nine kinds of surface coating materials.

The relationship between the amount of the PVA contained in the water-soluble resinous coating film and the adhesiveness of the resinous coating film to the to-be-coated material as well as the strength of the resinous coating film was examined. The result is shown in table 2. In table 2, the adhesiveness of the resinous coating film to the to-be-coated material was evaluated as "inferior", "average", "fine", and marked as X, Δ, and ○, respectively. The strength of the resinous coating film was evaluated as "frail", "average", "high", and "unmeasurable" and marked as X, Δ, ○ and -, respectively. In table 2, the amount of the PVA contained in the water-soluble resinous coating film was converted from the content of 40 % PVA.

As indicated in table 2, when the amount of the PVA contained in the water-soluble resinous coating film was 37 or more, the resinous coating films had a high degree of adhesiveness to the to-be-coated material, respectively. When the amount of the PVA contained in the water-soluble resinous coating film was 37–61 wt %, the resinous coating films had a high degree of strength, respectively.

TABLE 2

| added amount of 40% PVA (wt part) | amount of PVA added to water-soluble resinous coating film (%) | adhesiveness of the resinous coating film to the to-be-coated material | strength of the resinous coating film |
|---|---|---|---|
| 100 | 28 | X | — |
| 125 | 32 | X | — |
| 150 | 37 | Δ | ○ |
| 175 | 40 | ○ | ○ |
| 200 | 43 | ○ | ○ |
| 250 | 49 | ○ | ○ |
| 300 | 54 | ○ | ○ |
| 350 | 57 | ○ | Δ |
| 400 | 61 | ○ | Δ |

Embodiment 10

Water solutions containing different amount of polyethylene-imine were applied to a surface of each to-be-coated material and a composite film was applied to the surface of each to-be-coated material to form surface coating materials.

(1) Process of manufacturing composite film

Water-insoluble resin is applied to a base sheet by means of an applicator to form a water-insoluble resinous coating film having a Wet thickness of 50 μm.

The water-insoluble resinous coating film contained 70 parts by weight of Hitaloid 7850 (manufactured by Hitachi Kasei Kogyo Co., Ltd.); 30 parts by weight of Aronix M350 (manufactured by Toa Gosei Chemical Industry Co., Ltd.); four parts by weight of Darocure 1173 (manufactured by CIBA GEIGY(Japan) Co., Ltd.); and 200 parts by weight of Hitaloid 3079 (manufactured by Hitachi Kasei Kogyo Co., Ltd.). As the base sheet, a film of polyethylene terephthalate (Lumilor T-type manufactured by Toray Co., Ltd.) having a thickness of 50 μm was used.

Then, the water-insoluble resinous coating film was half-dried at 30° C. so that it had a thickness of 31 μm. Then, water-soluble resin was applied to the surface of the water-insoluble resinous coating film by means of an applicator to form a water-soluble resinous coating film having a Wet thickness of 50 μm on the water-insoluble resinous coating film.

The water-soluble resin consisted of 70 parts by weight of Aronix TO-1343 (manufactured by Toa Gosei Chemical Industry Co., Ltd.), 30 parts by weight of Karayad RM1001 (manufactured by Nippon Kayaku Co., Ltd.), and four parts by weight of Darocure 1173; and 200 parts by weight of a 40% methanol solution of the Goselan L-0301 (manufactured by The Nippon Synthetic Chemical Industry Co., Ltd.).

Then, the water-soluble resinous coating film was dried at 30° C. so that it had a thickness of 28 μm. In this manner, a composite film consisting of one layer of the water-insoluble resinous coating film and one layer of the water-soluble resinous coating film was obtained.

(2) Water-applying Process

Then, Toyo Color Floor Lead II (Toyo Plywood Co., Ltd.) was prepared as floorings, namely, to-be-coated materials. 3 g of five water solutions containing 0.5 wt %, 1.0 wt %, 3.0 wt %, 5.0 wt %, and 10.0 wt % of polyethylene-imine (Lupazol WF: manufactured by BASF Co., Ltd.), respectively was applied to the surface of each to-be-coated material per $m^2$. That is, 0.015 g, 0.03 g, 0.09 g, 0.15 g, and 0.3 g of the polyethylene-imine was applied to the surface of each to-be-coated material per $m^2$.

(3) Composite Film-coating Process

Immediately after the polyethylene-imine was applied to each flooring, namely, each to-be-coated material, a composite film was placed on each to-be-coated material. Then, using a rubber roller (No. 4, manufactured by Otsuka Brush Manufacturing Co., Ltd.), the composite film was pressed against each to-be-coated material. As a result, the surface of the water-soluble resinous coating film of each composite film was brought into contact with the surface of each to-be-coated material (flooring surface) closely through each polyethylene-imine-contained water solution.

Thereafter, each water-soluble resinous coating film was dried at 30° C. for 30 minutes to dry it. Then, using the high-pressure mercury vapor lamp (H05-L21: manufactured by Eye Graphics Co., Ltd.) as the light source of ultraviolet rays, the surface of the base sheet of each composite film was irradiated with ultraviolet rays whose amount of light was 4,000 mJ. The ultraviolet rays reached the water-insoluble resinous coating film and the water-soluble resinous coating film through each base sheet, thus hardening both coating films to form a resinous coating film.

Then, the base sheet was peeled off from the resinous coating film to obtain five kinds of surface coating materials.

The relationship between the amount of the polyethylene-imine contained in the water and the adhesiveness of the composite film to the to-be-coated material as well as the strength of the resinous coating film was examined, similarly to embodiment 9. The result is shown in table 3. As indicated in table 3, in all the surface coating materials, the adhesivenesses of the composite films to the to-be-coated material and the strengths thereof were superior.

TABLE 3

| amount of polyethylene-imine added to water (g/m$^2$) | adhesiveness of the resinous coating film to the to-be-coated material | strength of the resinous coating film |
|---|---|---|
| 0.015 | Δ | ○ |
| 0.03 | ○ | ○ |
| 0.09 | ○ | ○ |
| 0.15 | ○ | ○ |
| 0.3 | ○ | ○ |

Embodiment 11

Polyethylene-imine having different concentrations was added to a water-soluble resinous coating film in manufacturing a surface coating material.

(1) Process of Manufacturing Composite Film

Water-insoluble resin is applied to a base sheet by means of an applicator to form a water-insoluble resinous coating film having a Wet thickness of 50 μm.

The water-insoluble resinous coating film contained 70 parts by weight of Hitaloid 7850 (manufactured by Hitachi Kasei Kogyo Co., Ltd.); 30 parts by weight of Aronix M350 (manufactured by Toa Gosei Chemical Industry Co., Ltd.); four parts by weight of Darocure 1173 (manufactured by CIBA GEIGY(Japan) Co., Ltd.); and 200 parts by weight of Hitaloid 3079 (manufactured by Hitachi Kasei Kogyo Co., Ltd.).

As the base sheet, a film of polyethylene terephthalate (Lumilor T-type manufactured by Toray Co., Ltd.) having a thickness of 50 μm was used.

Then, the water-insoluble resinous coating film was half-dried at 30° C. so that it had a thickness of 31 μm. Then, five kinds of water-soluble resins containing polyethylene-imine having different concentrations were applied to the surface of the water-insoluble resinous coating film by means of an applicator to form five water-soluble resinous coating films each having a Wet thickness of 50 μm on the water-insoluble resinous coating film.

The water-soluble resin consisted of 70 parts by weight of Aronix TO-1343 (manufactured by Toa Gosei Chemical Industry Co., Ltd.), 30 parts by weight of Karayad RM1001 (manufactured by Nippon Kayaku Co., Ltd.), four parts by weight of Darocure 1173; and 200 parts by weight of a 40% methanol solution of the Goselan L-0301 (manufactured by The Nippon Synthetic Chemical Industry Co., Ltd.), three parts by weight of Lupazol WF; and the polyethylene-imine whose part by weight was varied from 0.5, 1, 3, 4, and 5.

Then, the water-soluble resinous coating film was dried at 30° C. so that it had a thickness of 28 μm. In this manner, a composite film consisting of one layer of the water-insoluble resinous coating film and one layer of the water-soluble resinous coating film was obtained.

(2) Water-applying process

Then, 3 g of five water solutions was applied to Toyo Color Floor Lead II (manufactured by Toyo Plywood Co., Ltd.) prepared as floorings, namely, to-be-coated materials.

(3) Composite film-coating process

Then, a composite film was placed on each flooring, namely, each to-be-coated material.

Then, using a rubber roller (No. 4, manufactured by Otsuka Brush Manufacturing Co., Ltd.), the composite film was pressed against each to-be-coated material. As a result, the surface of the water-soluble resinous coating film of each composite film was brought into contact with the surface of each to-be-coated material (flooring surface) closely through each polyethylene-imine-contained water solution.

Thereafter, each water-soluble resinous coating film was dried at 30° C. for 30 minutes to dry it. Then, using the high-pressure mercury vapor lamp (H05-L21: manufactured by Eye Graphics Co., Ltd.) as the light source of ultraviolet rays, the surface of the base sheet of each composite film was irradiated with ultraviolet rays whose amount of light was 4,000 mJ. The ultraviolet rays reached the water-insoluble resinous coating film and the water-soluble resinous coating film through each base sheet, thus hardening both coating films to form a resinous coating film.

Then, the base sheet was peeled off from the resinous coating film to obtain five kinds of surface coating materials.

The relationship between the amount of the polyethylene-imine contained in the water-soluble resinous coating film and the adhesiveness of the composite film to the to-be-coated material was examined, similarly to embodiment 9. Further, the property of the water-soluble resin was also examined. The result is shown in table 4. In table 4, the water-soluble resin which was not gelled within 24 hours was marked as ○, whereas the water-soluble resin which was gelled within 24 hours was marked as X.

As indicated in table 4, when the water-soluble resinous coating film contained 0.18–0.72 g/m$^2$ of the polyethylene-imine, the composite film was superior in its adhesiveness of the composite film to the to-be-coated material and the property.

TABLE 4

| amount of polyethylene-imine added to water-soluble resinous coating film (wt part) | amount of added polyethylene-imine ($g/m^2$) | adhesiveness of the resinous to the to-be-coated material | property of water-soluble resin |
|---|---|---|---|
| 0.5 | 0.09 | X | ○ |
| 1 | 0.18 | Δ | ○ |
| 3 | 0.54 | ○ | ○ |
| 4 | 0.72 | ○ | ○ |
| 5 | 0.89 | — | X |

While the invention has been described with reference to embodiments, it is to be understood that modification or variations may be easily made by a person of ordinary skill in the art without departing from the scope of the invention which is defined by the appended claims.

What is claimed is:

1. A composite film comprising a base sheet having a property of transmitting light therethrough, and at least one water-soluble resin coating film thereon, wherein one of said at least one water-soluble resinous coating films has an outer surface which coincides with an outer surface of said composite film, and wherein said composite film is adapted to adhere to a material upon both interposition of water between said outer surface and said material and hardening of the water-soluble resinous coating film having said outer surface to form a water-insoluble film, and wherein at least one of said water-soluble resinous coating films is hardened by irradiation.

2. The composite film according to claim 1, wherein the water-soluble resinous coating film having said outer surface contains a reactive compound having vinyl groups and functional group; a reaction initiator; and a hardener.

3. The composite film according to claim 1, wherein the water-soluble resinous coating film having said outer surface contains the reactive compound having the vinyl groups and the reaction initiator.

4. The composite film according to claim 1, wherein the water-soluble resinous coating film having said outer surface comprises a water-soluble adhesive agent.

5. The composite film according to claim 1, wherein at least one layer of water-insoluble resinous coating film is interposed between the base sheet and the water-soluble resinous coating film.

6. The composite film according to claim 1, wherein the outer surface of the water-soluble resinous coating film of the composite film is coated with a release sheet.

7. The composite film according to claim 1, wherein the water-soluble resinous coating film having said outer surface contains polyvinyl alcohol.

8. The composite film according to claim 7, wherein the polyvinyl alcohol is contained in the water-soluble resinous coating film at a weight percentage of 37–61 with respect to a whole weight of resin contained in the water-soluble resinous coating film.

9. The composite film according to claim 7, wherein the water-soluble resinous coating film contains polyethylene-imine.

10. The composite film according to claim 9, wherein 0.15 $g/m^2$–0.80 $g/m^2$ of the polyethylene-imine is contained in the water-soluble resinous coating film.

11. The composite film according to claim 1, wherein the composite film contains an anti-fungus agent at a portion other than the base sheet.

12. The composite film according to claim 1, wherein the composite film contains an ultraviolet absorbing agent at a portion other than the base sheet.

13. A method of manufacturing a surface coating material comprising the steps of:

preparing a composite film having at least one water-soluble resinous coating film and a base sheet to which the water-soluble resinous coating film adheres and which passes light therethrough;

applying water to a surface of the water-soluble resinous coating film or a surface of a to-be-coated material to which the water-soluble resinous coating film adheres;

placing the composite film on the surface of the to-be-coated material, with the water-soluble resinous coating film confronting the surface of the to-be-coated material;

irradiating a surface of the composite film with light emitted to the base sheet; and removing the base sheet from the water-soluble resinous coating film.

14. The method according to claim 13, wherein a surface of the base sheet is irradiated with infrared light, visible light, ultraviolet light, sun beam or electron beam.

15. The method according to claim 13, wherein an application amount of water is in a range of 1.5 $g/m^2$–10 $g/m^2$.

16. The method according to claim 13, wherein an application amount of water is in a range of 1.5 $g/m^2$–6 $g/m^2$.

17. The method according to claim 13, wherein an organic solvent, a surface active agent and/or a water-soluble resin are applied to the water.

18. The method according to claim 13, wherein the composite film has a water-insoluble resinous coating film provided between the water-soluble resinous coating film and the base sheet.

19. The method according to claim 13, wherein polyethylene-imine and polyvinyl alcohol is contained in the water-soluble resinous coating film or the water.

20. The method according to claim 19, wherein the polyvinyl alcohol is contained in the water-soluble resinous coating film in a range of 37–61 wt % with respect to a whole weight of resin contained in the water-soluble resinous coating film.

21. The method according to claim 19, wherein the polyethylene-imine is contained in the water-soluble resinous coating film in a range of 0.15–0.80 $g/m^2$ per one centiare of the water-soluble resinous coating film.

22. The method according to claim 19, wherein the polyethylene-imine is contained in water such that when the water is applied to an area of one centiare of the surface of the to-be-coated material or the surface of the composite film, an application amount of the polyethylene-imine is set to 0.015 g or more.

23. The method according to claim 13, wherein the composite film contains an anti-fungus agent at a portion other than the base sheet.

24. The method according to claim 13, wherein the composite film contains an ultraviolet absorbing agent at a portion other than the base sheet.

* * * * *